US009886012B2

(12) United States Patent
Maturana et al.

(10) Patent No.: US 9,886,012 B2
(45) Date of Patent: Feb. 6, 2018

(54) COMPONENT FACTORY FOR HUMAN-MACHINE INTERFACE MIGRATION TO A CLOUD PLATFORM

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 730 days.

(21) Appl. No.: 14/478,974

(22) Filed: Sep. 5, 2014

(65) Prior Publication Data
US 2015/0277404 A1 Oct. 1, 2015

Related U.S. Application Data

(60) Provisional application No. 61/970,798, filed on Mar. 26, 2014.

(51) Int. Cl.
*G05B 15/02* (2006.01)
*H04L 29/08* (2006.01)
(Continued)

(52) U.S. Cl.
CPC .......... *G05B 15/02* (2013.01); *G06F 9/4443* (2013.01); *G06F 9/5072* (2013.01); *H04L 67/10* (2013.01)

(58) Field of Classification Search
CPC ..... G05B 15/02; G06F 9/4443; G06F 9/5072; H04L 67/10
(Continued)

(56) References Cited

U.S. PATENT DOCUMENTS 5,519,605 A 5/1996 Cawlfield
6,230,010 B1 5/2001 Morris
(Continued)

FOREIGN PATENT DOCUMENTS

CN 1755564 4/2006
CN 1937559 3/2007
(Continued)

OTHER PUBLICATIONS

Extended European Search Report for EP Serial No. 15160984.9, dated Jul. 4, 2016, 10 pages.
(Continued)

*Primary Examiner* — Ryan Coyer
(74) *Attorney, Agent, or Firm* — Amin, Turocy & Watson, LLP

(57) ABSTRACT

A cloud human-machine interface (HMI) generation system converts an original HMI project to a web-compatible version of the HMI capable of storage and execution on a cloud platform or web server. The cloud HMI generation system parses HMI project files exported from the original HMI to identify graphical objects and their attributes, animations, data tags linked to the HMI, and other characteristics of the HMI. The system then generates scripts or function calls that reproduce the identified graphical objects and their associated animations, yielding a web-based HMI that emulates the original HMI project. The resulting cloud HMI can retrieve copies of the original industrial system data maintained on cloud-based storage, allowing the cloud HMI to display near real-time system data on a client device from any location.

20 Claims, 17 Drawing Sheets

(51) Int. Cl.
*G06F 9/44* (2006.01)
*G06F 9/50* (2006.01)

(58) Field of Classification Search
USPC .................. 700/83; 717/105–106, 109–110
See application file for complete search history.

(56) References Cited

U.S. PATENT DOCUMENTS

| | | |
|---|---|---|
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 2003/0014387 A1 | 1/2003 | Kreidler et al. |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0193285 A1 | 9/2005 | Jeon |
| 2006/0068762 A1 | 3/2006 | Baldwin et al. |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0089227 A1 | 4/2009 | Sturrock et al. |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1 | 10/2010 | McLaughlin et al. |
| 2010/0256795 A1* | 10/2010 | McLaughlin ...... G05B 19/4183 700/110 |
| 2010/0257228 A1 | 10/2010 | Staggs et al. |
| 2011/0066298 A1 | 3/2011 | Francino |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0166963 A1* | 6/2012 | Kohli .................. G06F 9/44 715/744 |
| 2012/0232869 A1 | 9/2012 | Maturana et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1* | 6/2013 | Timsjo ................. G05B 15/02 700/83 |
| 2013/0191106 A1 | 7/2013 | Kephart et al. |
| 2013/0211559 A1* | 8/2013 | Lawson ........... G06Q 10/06315 700/83 |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0115592 A1 | 4/2014 | Frean et al. |
| 2014/0147064 A1 | 5/2014 | Omori |
| 2014/0156234 A1 | 6/2014 | Maturana et al. |
| 2014/0164124 A1 | 6/2014 | Rhoads |
| 2014/0207868 A1 | 7/2014 | Gordon et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1 | 9/2014 | Nixon et al. |
| 2014/0337473 A1 | 11/2014 | Frusina et al. |
| 2015/0220080 A1 | 8/2015 | Nixon et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.

(56) References Cited

OTHER PUBLICATIONS

European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jul. 28, 2017, 33 pages.
Office Action for U.S. Appl. No. 14/639,279, dated Aug. 9, 2017, 66 pages.
Chinese Office Action for Chinese Application Serial No. 201510138210.1 dated Jul. 12, 2017, 14 pages (with English translation).
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/525,149 dated Oct. 5, 2017, 88 pages.
Office Action for U.S. Appl. No. 15/431,128 dated Oct. 18, 2017, 37 pages.
Office Action for U.S. Appl. No. 14/639,279 dated Nov. 15, 2017, 75 pages.

\* cited by examiner

COMPONENT FACTORY FOR HUMAN-MACHINE INTERFACE MIGRATION TO A CLOUD PLATFORM

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial human-machine interfaces (HMIs), and, more particularly, to a cloud HMI generation system that converts an existing HMI application to a cloud-compatible or web-compatible format.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for generating an HMI application capable of execution on a cloud platform is provided, comprising an import component configured to import one or more HMI project files that define an HMI project developed in a first format; an element drawing component configured to identify one or more first graphical objects defined by the one or more HMI project files and to generate one or more drawing scripts that, in response to execution, reproduce the one or more graphical objects in a second format to yield one or more second graphical objects; a tag identification component configured to identify one or more data tags defined by the HMI project files; and a cloud mapping component configured to generate one or more data retrieval scripts that, in response to execution, retrieve one or more data items corresponding to the one or more data tags from a specified data source.

Also, one or more embodiments provide a method for converting a human-machine interface (HMI) application to a cloud-capable HMI application is provided, comprising receiving, by a system comprising a processor, an HMI project file that defines an HMI project developed in a first format; parsing the HMI project file to identify a first graphical object defined by the HMI project file and a data tag that controls a state of the first graphical object; generating a drawing script that, in response to execution, reproduces the graphical object in a second format to yield a second graphical object; and generating a data retrieval script that, in response to execution, retrieves a data item corresponding to the data tag from a defined data source.

Also, according to one or more embodiments, a non-transitory computer-readable medium is provided having stored thereon instructions that, in response to execution, cause a system to perform operations, the operations, comprising receiving one or more HMI project files that define an HMI project developed in a first format; parsing the HMI project files to identify a first graphical object defined by the one or more HMI project files and a data tag that controls a state of the first graphical object; generating a drawing script that, in response to execution, draws the first graphical object in a second format to yield a second graphical object; and generating a data retrieval script that, in response to execution, retrieves a data item corresponding to the data tag from a specified data source.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
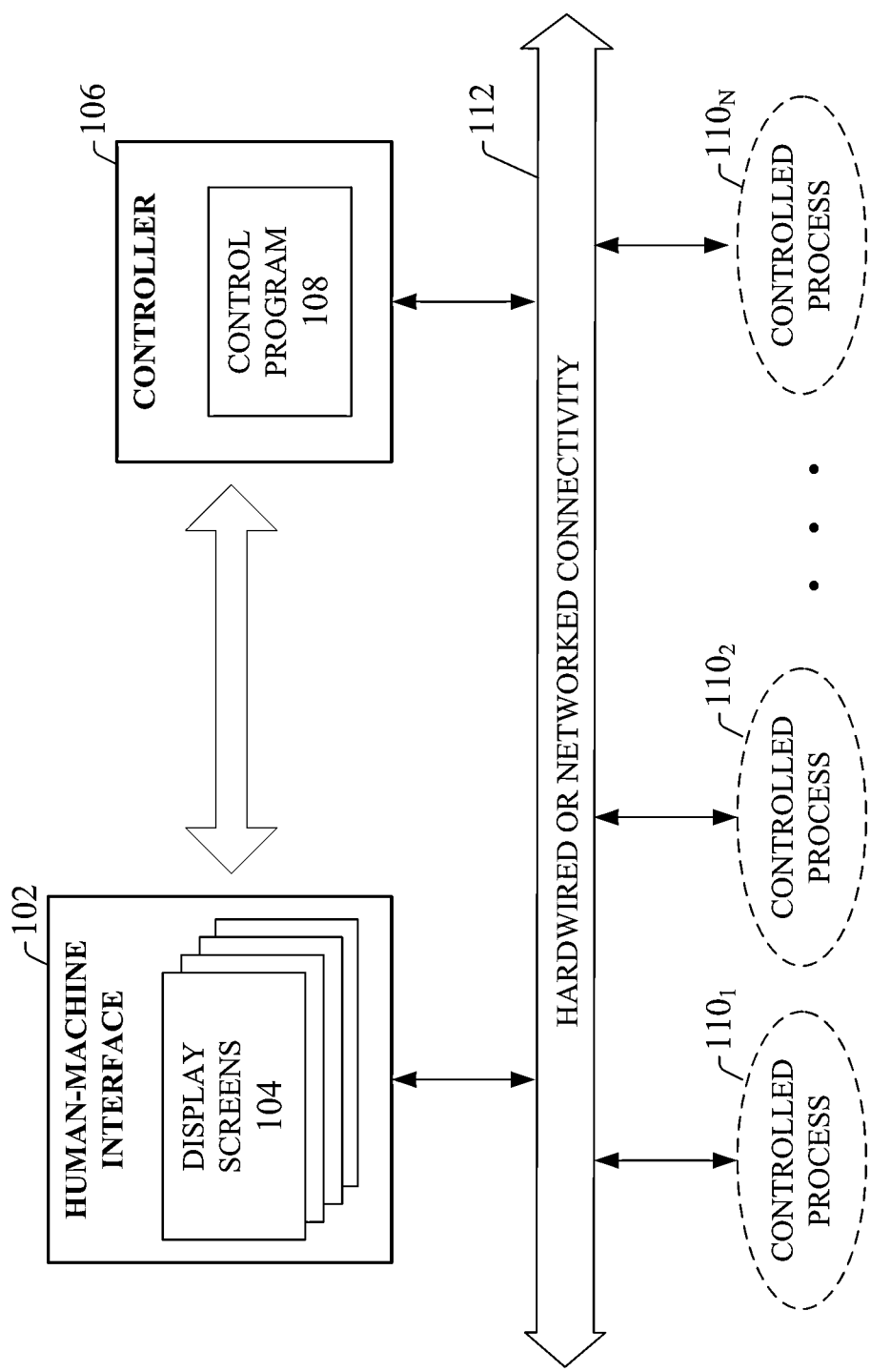
FIG. 1 is a block diagram of a generalized control environment including an industrial controller and an HMI.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

Industrial automation systems often include one or more operator interfaces—also referred to as human-machine interfaces (HMIs)—that allow plant personnel to view telemetry and status data associated with the automation system, and to control some aspects of system operation. FIG. 1 is a block diagram of a generalized control environment including an industrial controller and an HMI. An industrial facility can comprise one or more controlled processes $110_1$-$110_N$ relating to product manufacture, machining, motion control, batch processing, material handling, or other such industrial functions. Controlled processes $110_1$-$110_N$ can be monitored and controlled by at least one controller 106. Controller 106 can comprise an industrial controller, such as a programmable logic controller (PLC) or other such programmable automation controller (PAC), that executes a control program 108 to facilitate monitoring and control of controlled processes $110_1$-$110_N$. Controller 106 may also comprise a soft controller executed on a personal computer or other hardware platform. Control program 108 can comprise any conceivable type of code used to process input signals read into the controller 106 and to control output signals from the controller, including but not limited to ladder logic, sequential function charts, function block diagrams, or structured text. Data read into or generated by controller 106 can be stored in a data table within controller memory, which can comprise native memory or removable storage media.

Controller 106 may communicatively interface with controlled processes 110₁-110ₙ over hardwired or networked connections 112. For example, controller 106 can be equipped with native hardwired inputs and outputs that communicate with one or more field devices associated with the controlled processes 110₁-110ₙ to effect control of the devices. The native controller I/O can include digital I/O that transmits and receives discrete voltage signals to and from the field devices, or analog I/O that transmits and receives analog voltage or current signals to and from the devices. The controller I/O can communicate with the controller's processor over a backplane such that the digital and analog signals can be read into and controlled by the control programs. Controller 106 can also communicate with field devices over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 106 is not limited to the above specifications, and can include virtually any type of controller used to control an industrial process.

The example system also includes at least one human-machine interface 102 (e.g., a human-machine interface, or HMI) communicatively coupled with controller 106 (e.g., via network 112). HMI 102 can exchange data with controller 106 to facilitate visualization of information relating to controlled processes 110₁-110ₙ and to allow an operator to submit data to controller 106 in the form of issued commands (e.g., cycle start commands, device actuation commands, etc.), setpoint values, and the like. HMI 102 can generate one or more display screens 104 through which the operator interacts with the controller 106, and thereby with the controlled processes 110₁-110ₙ. Example display screens can visualize present states of the controlled processes 110₁-110ₙ using graphical representations of the processes that display metered or calculated values, employ color or position animations based on state, render alarm notifications, or employ other such techniques for presenting relevant data to the operator. Data presented in this manner is read from controller 106 by HMI 102 and presented on one or more of the display screens 104 according to display formats chosen by the system developer.

Since HMI 102 requires access to data within the industrial controller 106, and therefore must share a common network 112 with the industrial controller, such operator interface systems must be executed on-site using local computing resources (typically located in proximity to the automation systems being monitored). Consequently, industrial data and statuses can only be viewed by personnel in proximity to the automation system (e.g., on the plant floor). Moreover, the data available to such operator interfaces is limited to data stored in controllers sharing a common network with the operator interface terminal. Also, although a given industrial enterprise may comprise multiple plant facilities at geographically diverse locations (or multiple mobile systems having variable locations), the scope of a given operator interface is limited only to data available on controllers residing on the same local network as the operator interface.

To address these and other issues, one or more embodiments of the present disclosure provide a cloud HMI generation system that converts an HMI application or project to a web-based interface application capable of execution on a cloud platform. In one or more embodiments, the system can receive HMI project files associated with an HMI application, parse the files to identify the screens, graphical elements, and animations associated with the HMI, and generate scripts for drawing the identified graphical elements in a web-compatible format. This can comprise, for example, drawing the graphical elements onto a web-based canvas element. The system can also generate a list of data tags defined within the HMI application and identify correlations or mappings between the data tags and corresponding cloud database tags maintained on a cloud platform associated with the owner of the HMI application. Based on the mappings between the HMI data tags and the cloud database tags, the system can generate code for pulling data from the appropriate cloud database tags for display on the web-based HMI.

The resulting scripts and files generated by the cloud HMI generation system can then be exported to a web site or to a cloud platform for access by authorized personnel from any location. When the cloud-based HMI is invoked from a client device, the scripts and files generated by the cloud HMI generation system render a version of the original HMI on the client device, and retrieve the appropriate data items from cloud storage for display on the HMI interface screens. In some embodiments, a cloud agent architecture can be used to migrate data from the on-premise industrial systems to cloud-based storage on the cloud platform. This migrated data can be leveraged to animate the cloud HMI screens.

To illustrate an example operating context for the cloud HMIs described herein, an example high-level overview of an industrial enterprise that leverages cloud-based services is now described in connection with FIG. 2. The enterprise comprises one or more industrial facilities 204, each having a number of industrial devices 208 and 210 in use. The industrial devices 208 and 210 can make up one or more automation systems operating within the respective facilities 204. Exemplary automation systems can include, but are not limited to, batch control systems (e.g., mixing systems), continuous control systems (e.g., PID control systems), or discrete control systems. Industrial devices 208 and 210 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc. . . . ), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Figure 2:
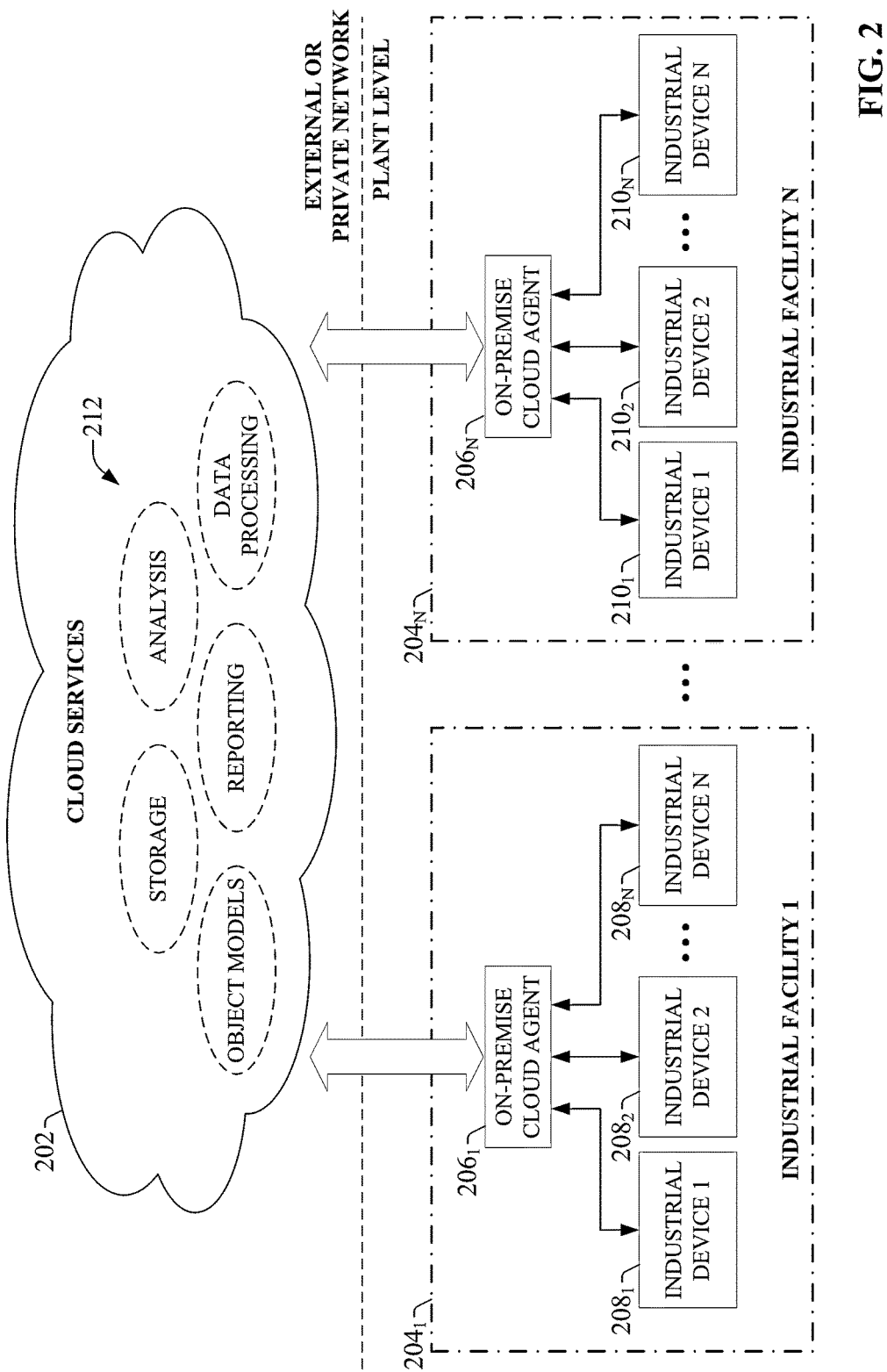
FIG. 2 is a high-level overview of an industrial enterprise that leverages cloud-based services.

Although the example overview illustrated in FIG. 2 depicts the industrial devices 208 and 210 as residing in fixed-location industrial facilities 204, the industrial devices 208 and 210 may also be part of a mobile control application, such as a system contained in a truck or other service vehicle.

According to one or more embodiments, on-premise cloud agents 206 can collect data from industrial devices 208 and 210—or from other data sources, including but not limited to data historians, business-level systems, etc.—and send this data to cloud platform 202 for processing and storage. Cloud platform 202 can be any infrastructure that allows cloud services 212 to be accessed and utilized by cloud-capable devices. Cloud platform 202 can be a public cloud accessible via the Internet by devices having Internet connectivity and appropriate authorizations to utilize the services 212. In some scenarios, cloud platform 202 can be provided by a cloud provider as a platform-as-a-service (PaaS), and the services 212 (such as the operator interface system described herein) can reside and execute on the cloud platform 202 as a cloud-based service. In some such configurations, access to the cloud platform 202 and the services 212 can be provided to customers as a subscription service by an owner of the services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), visualization applications such as the cloud-based HMIs described herein, reporting applications, Enterprise Resource Planning (ERP) applications, notification services, or other such applications. Cloud platform 202 may also include one or more object models to facilitate data ingestion and processing in the cloud. If cloud platform 202 is a web-based cloud, cloud agents 206 at the respective industrial facilities 204 may interact with cloud services 212 directly or via the Internet. In an exemplary configuration, the industrial devices 208 and 210 connect to the on-premise cloud agents 206 through a physical or wireless local area network or radio link. In another exemplary configuration, the industrial devices 208 and 210 may access the cloud platform 202 directly using integrated cloud agents. Cloud agents and their associated data collection and processing services are discussed in more detail below.

Ingestion of industrial device data in the cloud platform 202 through the use of cloud agents 206 can offer a number of advantages particular to industrial automation. For one, cloud-based storage offered by the cloud platform 202 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 206 can be configured to automatically detect and communicate with the cloud platform 202 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
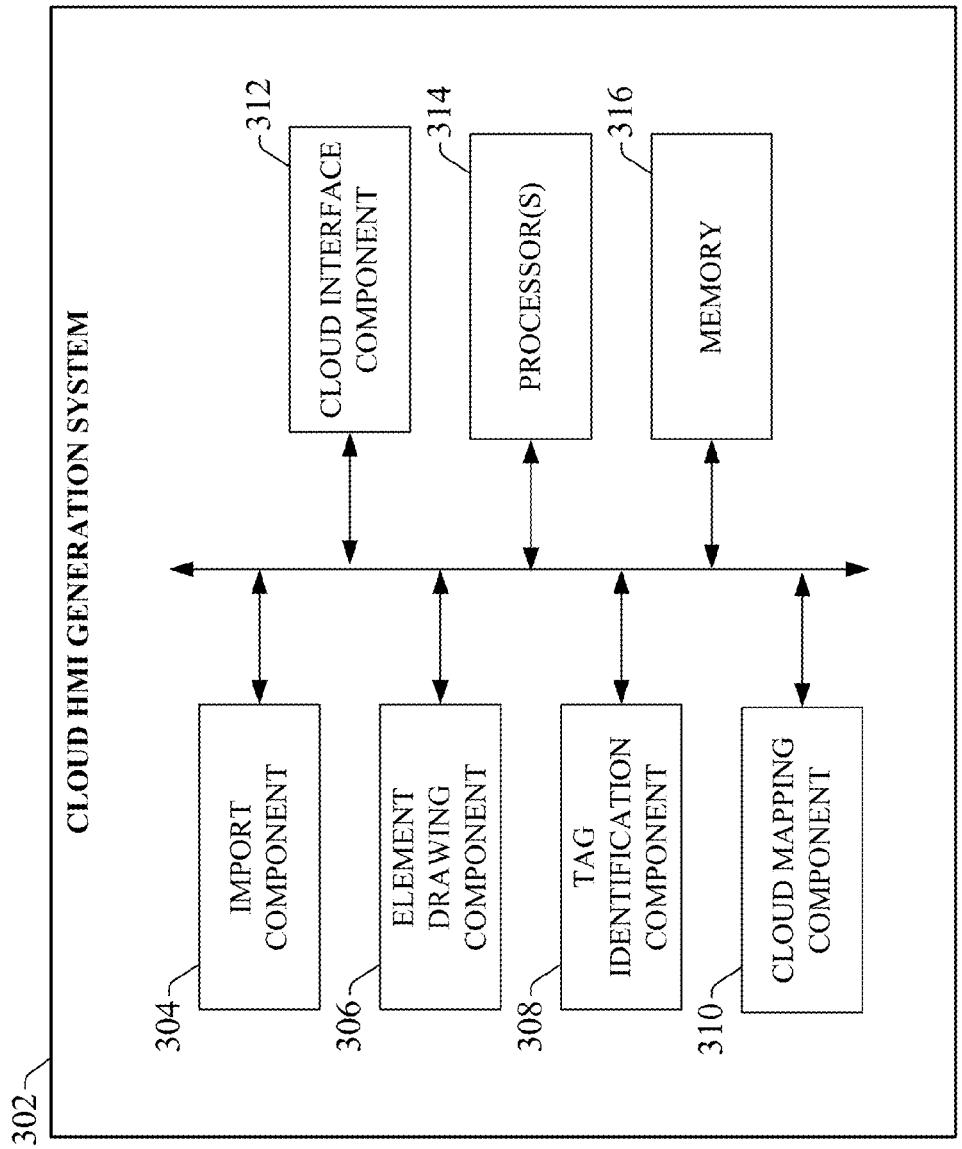
FIG. 3 is a block diagram of an example cloud HMI generation system.

FIG. 3 is a block diagram of an example cloud HMI generation system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud HMI generation system 302 can include an import component 304, an element drawing component 306, a tag identification component 308, a cloud mapping component 310, a cloud interface component 312, one or more processors 314, and memory 316. In various embodiments, one or more of the import component 304, element drawing component 306, tag identification component 308, cloud mapping component 310, cloud interface component 312, the one or more processors 314, and memory 316 can be electrically and/or communicatively coupled to one another to perform one or more of the functions of the cloud HMI generation system 302. In some embodiments, components 304, 306, 308, 310, and 312 can comprise software instructions stored on memory 316 and executed by processor(s) 314. Cloud HMI generation system 302 may also interact with other hardware and/or software components not depicted in FIG. 3. For example, processor(s) 314 may interact with one or more external user interface devices, such as a keyboard, a mouse, a display monitor, a touchscreen, or other such interface devices.

Import component 304 can be configured to import HMI files from an existing HMI application for conversion to a cloud-executable HMI application. These HMI files may comprise, for example, extensible markup language (XML) files associated with an existing HMI project. Element drawing component 306 can be configured to parse the HMI files received by the import component 304 to identify graphical objects defined for the HMI project, and to generate script function calls for drawing and animating the identified objects on the cloud-based HMI. The tag identification component 308 can be configured to identify data tags associated with the existing HMI application based on analysis of the imported HMI files. The data tags correspond to the data items generated by the industrial control system (e.g., controller tags corresponding to process variable values, telemetry values, status indicators, etc.) to be displayed on the HMI application, either as an alphanumeric indicator or as an animated graphic (e.g., a color-coded state indicator, a position-based indicator, etc.). The tag identification component 308 can generate a file identifying the data tags to be correlated with corresponding cloud database tags.

The cloud mapping component 310 can be configured to define correlations between the data tags identified by the tag identification component 308 and corresponding cloud database tags. The cloud database tags are used to identify the cloud storage locations of industrial data items that have been migrated from the on-premise industrial automation systems to cloud storage. The cloud mapping component 310 can also be configured to generate query scripts based on the defined correlations. These query scripts can pull the appropriate industrial data from cloud storage and populate the corresponding data tags of the cloud-based HMI with the retrieved data.

The cloud interface component 312 can be configured to establish a communicative link between cloud HMI generation system 302 and a cloud platform, and to export the files and scripts generated by the element drawing component 306, tag identification component 308, and cloud mapping component 310 to a specified storage location on the cloud platform. In some embodiments, the cloud interface component 312 can be instructed to export the files and scripts to a particular cloud platform associated with an owner of the industrial automation system for which the HMI is being generated, so that suitably authorized plant personnel can access the cloud platform and invoke the cloud-based HMI generated by the system.

The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed.

Figure 4:
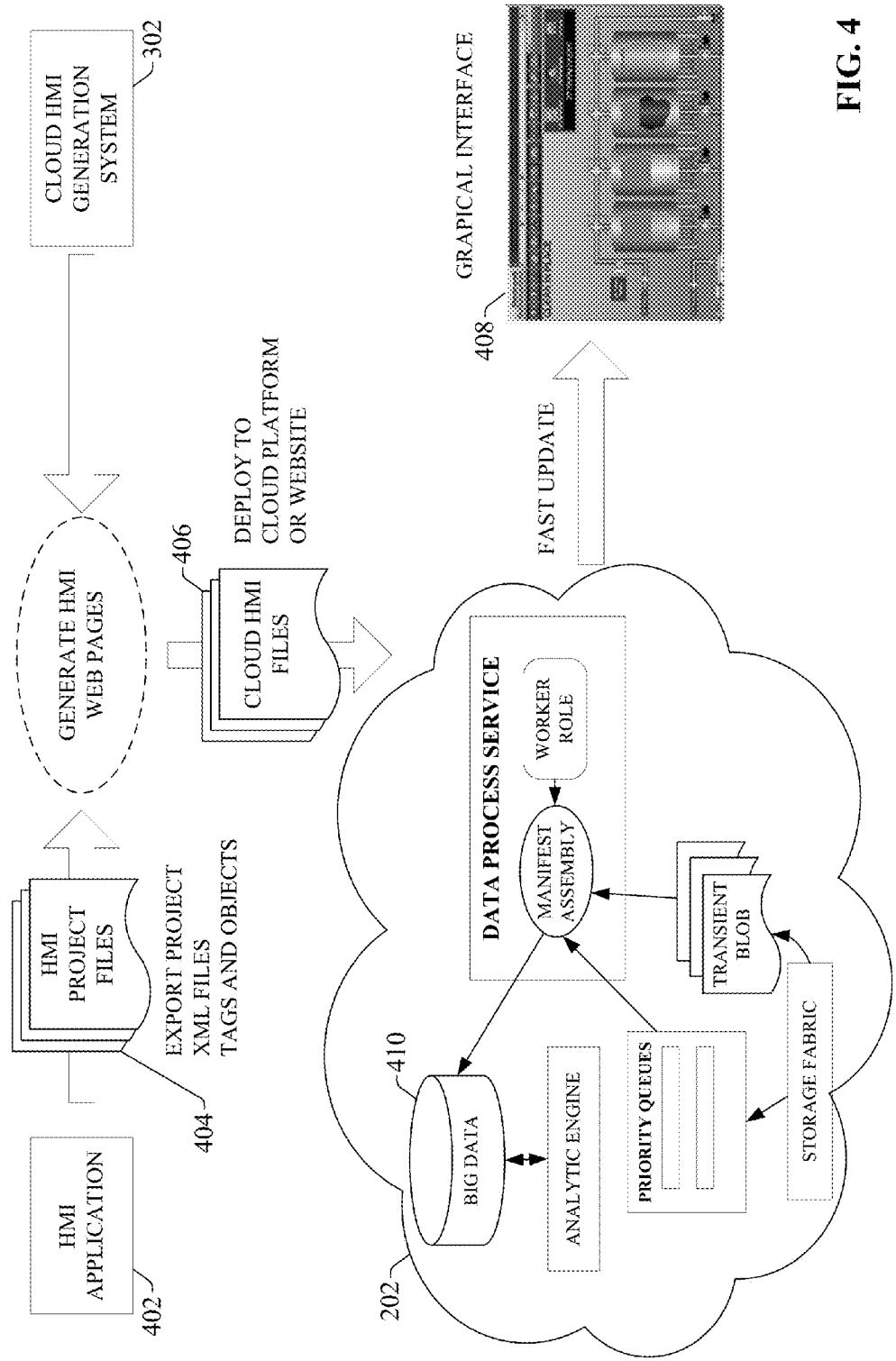
FIG. 4 is a conceptual overview of a general architecture for publishing cloud-based HMI applications to a cloud platform.

FIG. 4 is a conceptual overview of a general architecture for publishing cloud-based HMI applications to a cloud platform according to one or more embodiments. In this example, an HMI application 402 has been preconfigured for visualization of an industrial automation system. The HMI application 402 comprises a number of HMI project files 404 that define the interface screen layouts, screen navigations, graphical objects and their properties, animations, data tag definitions, communication pathways to data sources, and other such information. Similar to HMI 102 of FIG. 1, HMI application 402 is configured to communicate with one or more industrial controllers over a local network (e.g., a plant network such as CIP, EtherNetIP, data highway plus, or other network).

Cloud HMI generation system 302 is configured to generate an analogous cloud-based HMI based on analysis of the HMI project files 404 of HMI application 402. To this end, the HMI project files 404 are exported to the cloud HMI generation system 302. The HMI project files 404 can be exported in any suitable format. In some embodiments, the HMI project files 404 may be exported as XML files that can be imported and parsed by the cloud HMI generation system 302. The cloud HMI generation system 302 parses the HMI project files 404 to identify the interface screens, graphical objects, data tags, and other information required by the system 302 to generate a cloud-capable or web-based version of the HMI application 402. Based on analysis of the HMI project files 404, cloud HMI generation system 302 generates cloud HMI files 406, which can be deployed to cloud platform 202 or to a website for remote access. In some embodiments, the cloud HMI files 406 can include hypertext markup language (HTML) files (e.g., HTML5 web pages) comprising scripts generated by the cloud HMI generation system for drawing graphical elements on an HTML canvas element.

The cloud HMI files 406 may also include a list of tags to be correlated with corresponding cloud database tags. The cloud database tags point to items of industrial data collected from an on-premise industrial control system and migrated to cloud-based big data storage 410, where the collected data is stored in accordance with a defined cloud database schema. Example techniques for migrating on-premise industrial data to cloud-based storage for use by the cloud-based HMI are described in more detail herein.

Once the cloud HMI files 406 have been generated and deployed to the cloud platform 202 by cloud HMI generation system 302, the cloud HMI files 406 can be accessed remotely by any suitably authorized client device with permission to access the cloud platform 202 and the cloud-based HMI. When invoked remotely by a client device, the cloud HMI files 406 can instantiate a graphical interface 408 on the requesting client device. Using data retrieval scripts generated by the cloud HMI generation system 302 and included in the cloud HMI files 406, the graphical interface 408 can retrieve appropriate data items from cloud-based big data storage 410 and use the retrieved data to populate telemetry values, and to drive status indicators and other data-driven interface animations on the interface 408. In some embodiments, scripts included in the cloud HMI files 406 can push current data values from big data storage 410 to the graphical interface 408 using fast update scripts. In this way, a view-only version of HMI application 402 can be remotely accessed to facilitate remote monitoring of one or more industrial processes on the plant floor.

Figure 5:
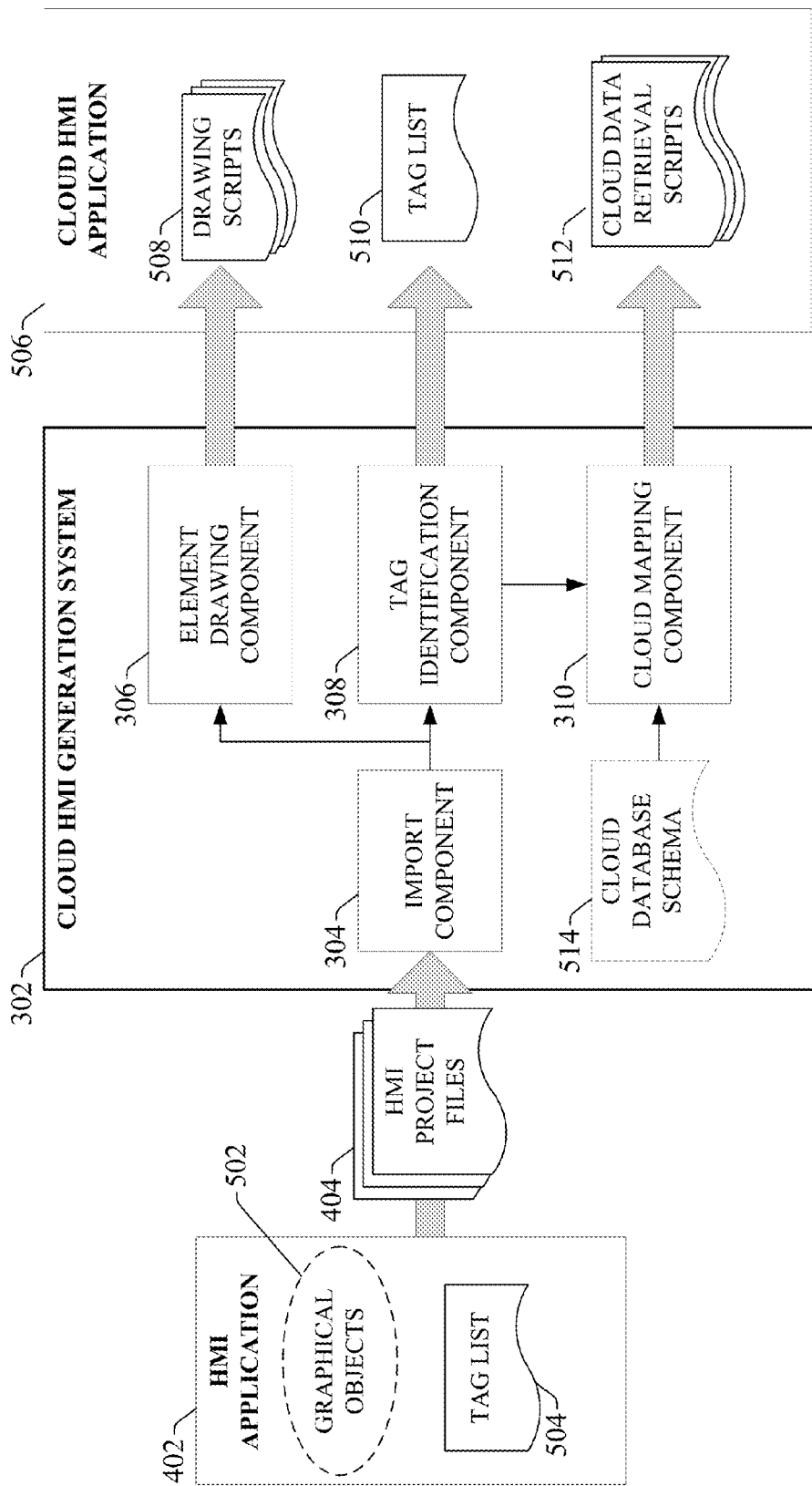
FIG. 5 is a block diagram illustrating creation of a cloud HMI file based on analysis of HMI project files imported from an existing HMI application.

FIG. 5 is a block diagram illustrating creation of a cloud HMI file based on analysis of HMI project files imported from an existing HMI application. HMI application 402 is an operator interface development project comprising the files necessary to execute an operator interface at runtime. The HMI project files 404 making up HMI application 402 can include, for example, files defining the operator interface screens, files identifying the graphical objects used on the respective interface screens (e.g., text objects, device graphics, soft push buttons or other controls, headers, shapes, etc.) as well as the locations of these objects on the respective screens, files defining the animations associated with one or more of the graphical objects, files identifying the list of data tags (e.g., controller tags or memory locations) that are mapped to respective graphical objects of the HMI, etc. In general, HMI application 402 comprises multiple graphical objects 502 located on one or more defined interface screens, where one or more of the graphical objects 502 are linked to respective data tags (typically controller data tags) to facilitate animating the graphical objects based on real-time values of the associated data tags. Accordingly, the HMI application 402 has an associated tag list 504 identifying the data tags to be read by the application and displayed on the interface (either as an alphanumeric display or as an animated state).

The HMI application 402 may also be designed to allow data to be written to one or more of the defined data tags through interaction with a data entry graphical object on one or more of the operator interface screens. For example, a numeric entry box may be located on one of the interface screens and linked to a controller data tag corresponding to a setpoint for a particular process variable. During runtime, an operator can enter a value into this input box, which causes the value to be written to the defined data tag in the controller.

HMI application 402 is typically designed to run on a local computer that is networked to the industrial controller (see, e.g., FIG. 1). The cloud HMI generation system 302 described herein can generate a reconfigured version of the HMI application 402 capable of delivery to a client device via a web-based platform, such as a cloud platform or web server, without the need to manually rebuild the HMI in another web-based format. To this end, the HMI project files 404 associated with HMI application 402 can be exported from the HMI application 402 and imported into the cloud HMI generation system via import component 304. The imported HMI project files 404 can then be parsed by element drawing component 306, tag identification component 308, and cloud mapping component 310, which can generate files and scripts for a cloud HMI application 506 capable of execution on a web platform (e.g., a cloud platform or web server). The resulting cloud HMI application 506 is a reconfigured, web-compatible version of HMI application 402 that can be invoked remotely by a web-capable device to facilitate remote viewing of an industrial system or process.

Element drawing component 306 can parse the HMI project files 404 to identify graphical objects in use on HMI application 402, as well as their properties (e.g., colors, shapes, locations on their respective interface screens, etc.), and any animations associated with the objects. Based on this analysis, the element drawing component 306 can generate suitable script or function calls for drawing the identified objects in the new web-compatible format. In an example scenario, the HMI project files 404 may be exported in a first format (e.g., XML or other export format supported by HMI application 402). After examining the HMI project files to identify the graphical objects and their properties, the element drawing component 306 can generate appropriate scripts or function calls (e.g., a Javascript function call or other suitable script) for drawing each identified object in a second format suitable for hosting and delivery by a web server or cloud platform (e.g., an HTML page). For example, the scripts or function calls may comprise Javascripts that draw the object on an HTML canvas element. In some embodiments, the scripts or function calls may reproduce the identified graphical objects using scalable vector graphics, which yield lightweight graphics that can be easily scaled to fit the size parameters of a user's client device. It is to be appreciated, however, that other suitable graphical formats are within the scope of one or more embodiments of this disclosure.

In a non-limiting example, the element drawing component 306 may discover a polygon object defined within the HMI project files 404, corresponding to a static polygon object located on one of the interface screens of HMI application 402. Upon discovery of the polygon object, the element drawing component 306 further examines the HMI project files 404 to determine whether any animations are attached to the polygon, and to identify the attributes associated with the polygon (e.g., background color and style, outline color and style, fill color, coordinate location on the interface screen, size, etc.). Based on this information, the element drawing component 306 generates a script function call that, upon execution, will draw the polygon in the web context (e.g., on an HTML canvas element) to match the original polygon on the HMI application 402. If no animation is associated with the polygon, the element drawing component 306 can generate the script without associating the shape with a data tag or an animation configuration.

In another example, the element drawing component 306 may identify a multistate indicator defined in the HMI project files 404. The multistate indicator is a graphical element having multiple display states. Accordingly, upon identification of the multistate indicator object and the defined attributes of each associated state, the element drawing component 306 can generate a script variable that controls the state of the indicator, and an if/then tree script to control the graphical attributes of each state. For example, the element drawing component 306 may extract the attributes (color, text, size, rotation, etc.) for each state defined in the HMI project files 404 and declare the identified attributes in respective IF branches of the if/then tree script corresponding to each state of the multistate indicator. The element drawing component 306 can then generate a dynamic function call, using the attribute variables assigned in the if/then tree, to draw the object in the web context (e.g., on the HTML canvas object) based on the current value of the script variable, which may be linked to a cloud data tag corresponding to the original controller tag that drove the animation on the original graphical object.

The element drawing component 306 can also convert objects having associated animations, so that the animation attributes defined in the original HMI application 402 are reproduced in the cloud HMI application 506. For example, the original HMI application 402 may include a rounded rectangle object that has an animated attribute (e.g., color, fill level, size, rotation, etc.) that is controlled based on the value of a particular data tag value read from an industrial controller. Upon identification of this rounded rectangle object, and after determining that the object has an associated animation configuration, the element drawing component 306 generates script variables that controls each assigned animation, and also generates the offsets, canvas scaling, clipping areas (fill), canvas rotation, etc. for the object. The element drawing component 306 also generates a dynamic function call, using the identified animation values, that will draw the rounded rectangle object in the appropriate state based on the value of the associated data tag. Whereas the original HMI application 402 read the data tag value directly from the data table of the controller itself, the cloud HMI application 506 will read the corresponding data tag value from a cloud storage location corresponding to the data tag, as will be described in more detail herein.

Using the techniques described above, the element drawing component 306 outputs a set of drawing scripts 508 for drawing each graphical element identified in the HMI application in a web-compatible format (e.g., scalable vector graphics on an HTML canvas).

Tag identification component 308 is configured to identify the list of data tags defined within the HMI application 402. The tag list 504 defined for the HMI application identifies the data tags (e.g., controller data tags) from which data is retrieved for display on the HMI application, as well as the data tags that are to receive the data written to the HMI's input objects. Tag identification component 308 can parse the HMI project files 404 to identify these data tags and their relationships to the graphical objects identified by the element drawing component 306, and generate a tag list 510 for the cloud HMI application 506 to be correlated with corresponding cloud database tags maintained in cloud storage.

As noted above, the data tags defined in the original tag list 504 were mapped to specified controller data tags to drive display and animation functions of the HMI application. In order to provide the same data to the corresponding data tags of the cloud HMI application 506, and thereby reproduce the real-time functionality of the HMI application 402 on the cloud HMI application 506, the controller data corresponding to the defined data tags can be migrated to cloud storage on a cloud platform, where the cloud HMI application 506 can retrieve the data during runtime for display on the cloud or web version of the HMI.

Accordingly, cloud mapping component 310 can be configured to receive tag list 510 from the tag identification component 308, and map each identified tag to the appropriate cloud database tag, which corresponds to the original controller data tag defined in tag list 504. In some embodiments, the cloud HMI generation system 302 may access a cloud database schema file 514 that defines the storage schema used to store data migrated from a customer facility on cloud storage. Based on the cloud storage locations for the customer's migrated system data defined by the cloud database schema file 514, the cloud mapping component 310 can correlate the tags defined in tag list 510 with the appropriate cloud database tags. Based on these correlations, the cloud mapping component 310 generates one or more cloud data retrieval scripts 512 for retrieving data from the appropriate cloud storage locations and mapping the retrieved data to the appropriate data tags. If the original HMI application 402 included tags for writing data to corresponding controller tags, the cloud mapping component 310 can also generate suitable data writing scripts for pushing data entered into a data entry object on the cloud HMI application to the appropriate cloud database tag. The cloud data retrieval scripts 512 can be generated in any suitable scripting language, and may use any suitable retrieval protocol for accessing the cloud data tags. For example, the cloud data retrieval scripts 512 may comprise Java code that performs JQuery calls to the cloud database to retrieve the necessary data from cloud storage. However, other languages and data retrieval protocols are within the scope of one or more embodiments of this disclosure.

Figure 6:
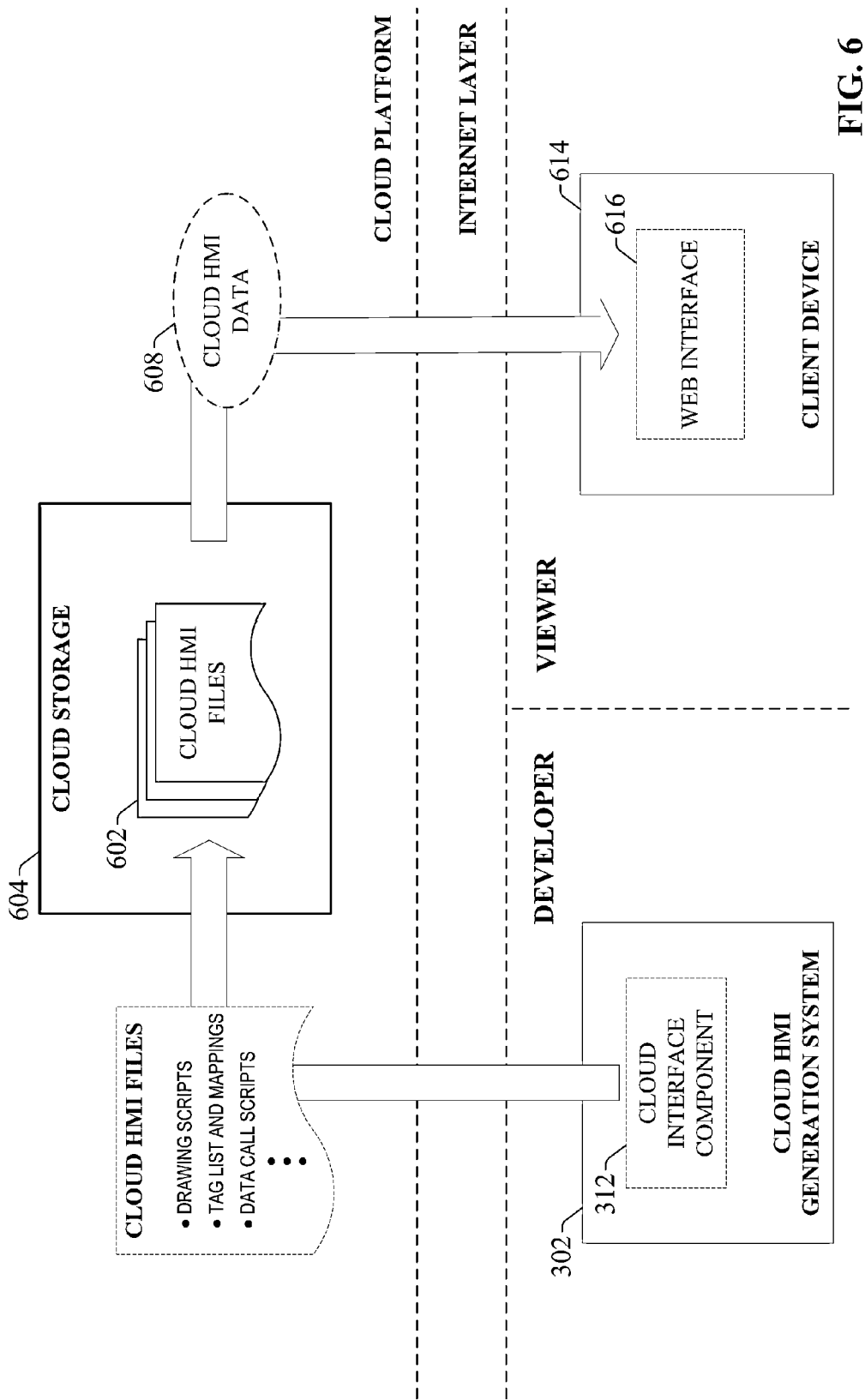
FIG. 6 is a block diagram illustrating uploading of cloud HMI files to a cloud platform for remote access.

Collectively, the drawing scripts 508, tag list 510, and cloud data retrieval scripts 512 make up cloud HMI application 506, which can be deployed on a web server or cloud platform for remote access and retrieval. FIG. 6 is a block diagram illustrating uploading of cloud HMI files to a cloud platform for remote access. In some embodiments, cloud HMI generation system 302 can include an integrated cloud interface component 312 configured to communicatively connect to a specified cloud platform and upload the cloud HMI files generated by the system 302 to cloud storage 604. In such embodiments, the cloud HMI generation system 302 may include a file that identifies the address of the cloud storage location (e.g., a uniform resource locator or other address information). Once uploaded, the cloud HMI files 602 can be invoked remotely by a client device 614 having authorization to access the cloud platform and view the remote data to be visualized by the cloud HMI. In some embodiments, cloud HMI generation system 302 can allow the HMI developer to define access privileges for the converted cloud HMI. For example, the system 302 can define password-protected access privileges, or can render access dependent on an identity or role of the user requesting access to the HMI. The system 302 can encode these defined access privileges in the cloud HMI files 602.

Although FIG. 6 illustrates the cloud HMI files 602 being delivered to a cloud platform by cloud HMI generation system 302, it is to be appreciated that the cloud HMI files generated by the cloud HMI generation system 302 can be stored in other locations for remote access. For example, the developer may export the cloud HMI files to a web server, to a local server, or directly to a client device where the web-based HMI can be invoked locally.

Figure 7:
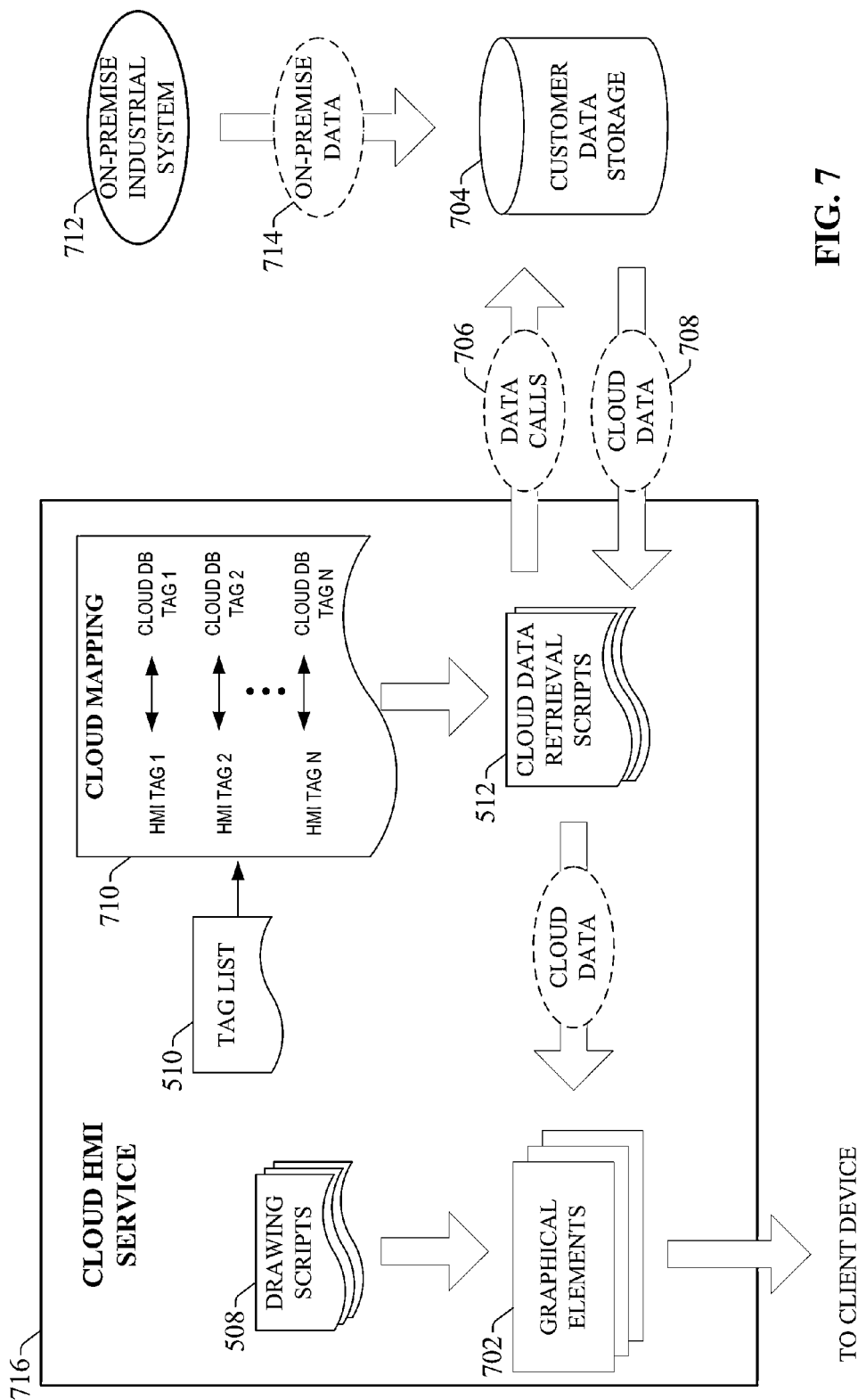
FIG. 7 is a block diagram illustrating execution of a cloud HMI application in response to invocation by a client device.

Returning now to FIG. 6, when invoked via a web interface 616 on client device 614, the cloud HMI files can send cloud HMI data 608 to the client device, which invokes the cloud HMI on the client device and renders a substantially real-time view of the industrial system data being monitored by the cloud HMI. The cloud HMI sends the reconfigured interface screens in web-compatible format, including the graphical objects drawn by the drawing scripts 508 and the data retrieved from cloud storage by the cloud data retrieval scripts 512. FIG. 7 illustrates execution of a cloud HMI application in response to invocation by a client device. The drawing scripts 508, cloud data retrieval scripts 512, and tag list 510 previously generated by the cloud HMI generation system 302, when deployed to a cloud platform or web server, can collectively implement a cloud HMI service 716 that serves web versions of the original HMI application to client devices. Drawing scripts 508 draw the graphical elements 702 for the cloud HMI. The drawing scripts 508 may comprise, for example, java scripts that draw the graphical elements 702 on HTML canvas elements. In some embodiments, the drawing scripts 508 may draw one or more of the graphical elements as scalable vector graphics (SVGs).

The cloud data retrieval scripts 512 previously generated by the cloud HMI generation system 302 execute data calls 706 to customer data storage 704 on a cloud platform to retrieve the data required to populate the graphical elements 702 with the appropriate data values or to drive HMI animations in a manner similar to the original HMI application (e.g., HMI application 402). Customer data storage 704 maintains on-premise data 714 migrated to the cloud platform from one or more industrial automation systems 712 being monitored. In some scenarios, the on-premise data 714 can be uploaded to the cloud platform in near real-time using on-premise cloud agent devices, as will be described in more detail herein.

The cloud data retrieval scripts 512 are based on the cloud mapping definitions 710 that define associations between HMI data tags defined in tag list 510 and corresponding cloud database tags maintained in customer data storage 704. The cloud data retrieval scripts 512 invoke data calls 706 to retrieve the cloud data 708 corresponding to cloud database tags defined in the cloud mapping definitions 710, and to map the retrieved cloud data 708 to the corresponding HMI data tags defined in tag list 510. Since some or all of the graphical elements 702 are animated based on the values of their corresponding HMI data tags, items of cloud data 708 will be provided to their corresponding graphical elements 702, which will render the data values as an alphanumeric string, an animated state, or any other defined format. The graphical elements 702—populated and animated by the cloud data 708—is then delivered to the client device requesting access to the cloud HMI.

The cloud data retrieval scripts 512 can redraw the graphical elements on the client device at regular intervals according to a defined frequency. A high frequency redraw rate (e.g., 250 ms) can ensure, for example, that blinking graphics are accurately reproduced on the version of the HMI rendered on the client device. The drawing scripts 508 may also redraw the graphical elements 702 in response to a command to scale or resized the cloud HMI screens at the client device (this redraw may happen asynchronously to the periodic redraw rate). The cloud data retrieval scripts 512 can pull data from customer data storage 704 at a different frequency relative to the redraw rate. A fast data retrieval rate can ensure that the interface screens are updated substantially in real-time as the data retrieved from cloud storage is updated (e.g., when new data values are migrated from the on-premise industrial automation system 712 being monitored to customer data storage 704). However, this data rate can be adjusted to accommodate data bandwidth restrictions. In some embodiments, the drawing scripts 508 and cloud data retrieval scripts 512 may automatically modify their respective redraw and data retrieval rates based on a measurement of the client device's local resources in order to optimize performance as a function of the user's device limitations.

Figure 8:
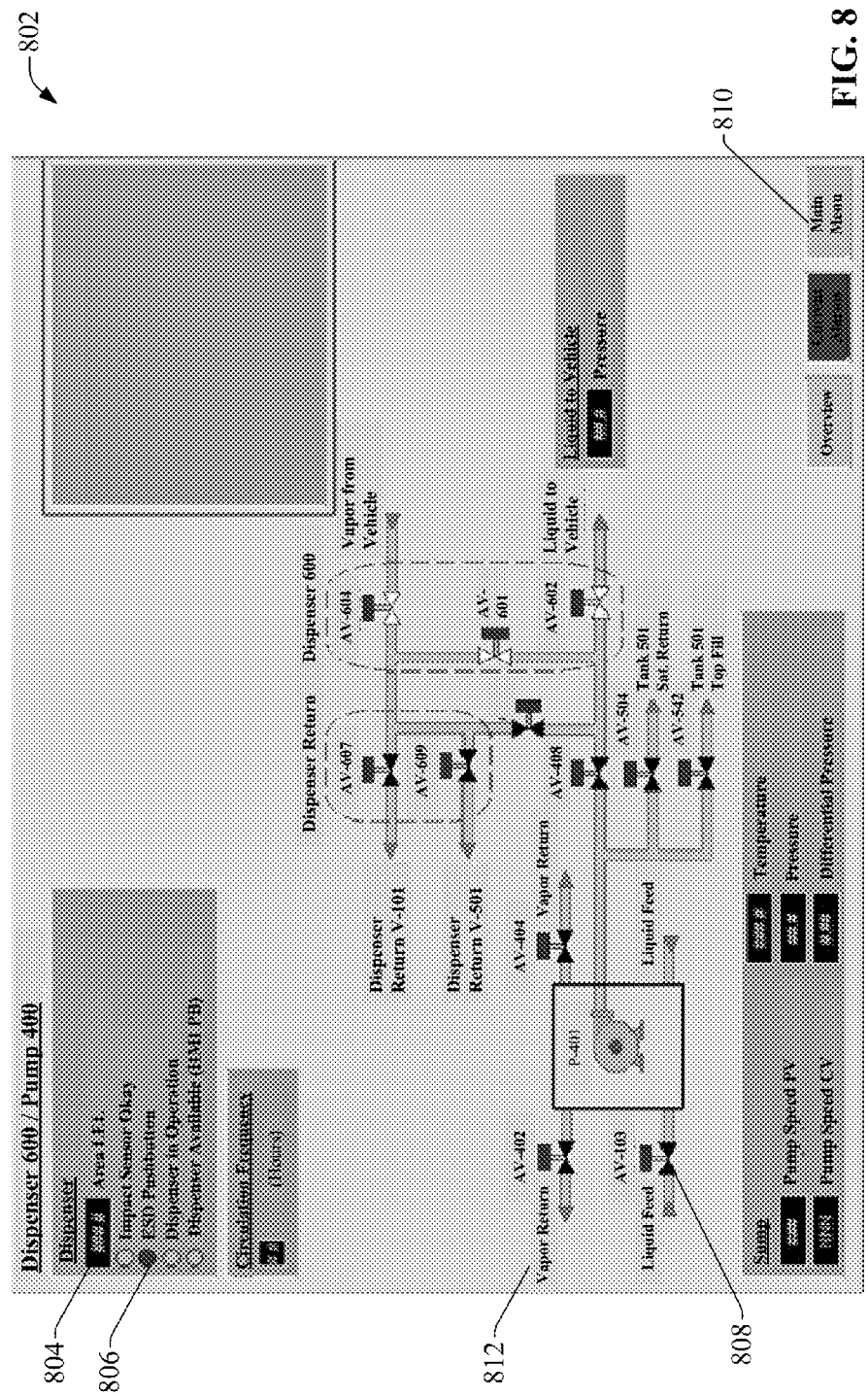
FIG. 8 illustrates an example cloud HMI interface screen generated by the cloud HMI generation system.

FIG. 8 is an example cloud HMI interface screen 802 generated by the cloud HMI generation system. Interface screen 802 includes a number of static text objects 812, which are reproduced by drawing scripts 508 that were generated by the cloud HMI generation system based on analysis of the original HMI. Interface screen 802 also includes a number of animated objects, including color-animated valve graphics 808 and circular status indicators 806. These animated objects are also drawn by drawing scripts 508 and are provided with data from their associated status data tags retrieved by cloud data retrieval scripts 512. Likewise, a number of numerical display objects 814 are drawn on interface screen 802, and are configured to display selected data retrieved by their associated cloud data retrieval scripts 512. A number of navigation pushbuttons 810 are drawn on the bottom right corner of interface screen 802 to facilitate navigation to other screens generated by the drawing scripts 508.

Figure 9:
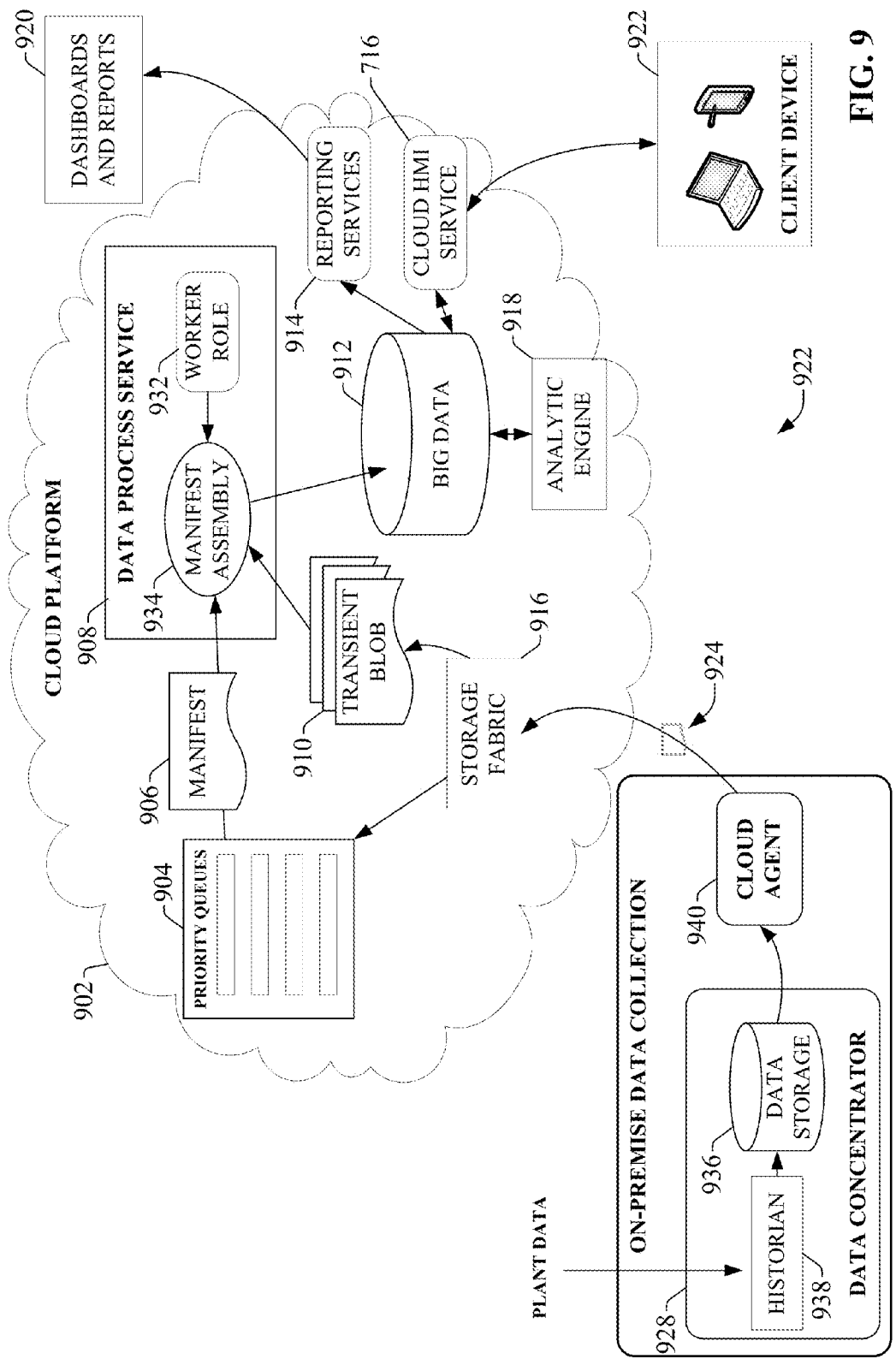
FIG. 9 is a conceptual overview of a system that leverages an agent-based cloud infrastructure to provide data collection and processing services to customer manufacturing sites.

As noted above, the cloud HMIs generated by the cloud HMI generation system are capable of retrieving and displaying operational and status data for an industrial automation system that has been migrated from the industrial system devices on the plant floor to cloud storage (e.g., customer data storage 704 of FIG. 7). Any suitable technique for moving plant floor data to cloud storage for display on the cloud HMI are within the scope of one or more embodiments of this disclosure. For example, in some embodiments a cloud agent architecture can be used to push industrial system data to the cloud platform. According to this cloud agent architecture, the industrial system data is collected by on-premise cloud agent devices, packaged into data packets, and pushed to the cloud platform for remote viewing. FIG. 9 is an overview of a system that leverages an agent-based cloud infrastructure to provide data collection and processing services to customer manufacturing sites. This system can provide remote collection and monitoring services in connection with remote viewing of data on the cloud HMI, alarm and event notification for critical industrial assets, historical data collection, remote system access, system optimization, remote closed-loop control, and other such applications.

In the example illustrated in FIG. 9 a data concentrator 928 collects plant data from one or more industrial assets (e.g., data generated by one or more industrial controllers, such as industrial devices 208 or 210) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 928 can monitor one or more controller tags defined in a tag archive and store data in local data storage 936 (e.g., a local structured query language, or SQL, server) associated with a historian 938. The collected data can include historical data (e.g., alarm history, status history, trend data, etc.), live data values read from the industrial assets, alarm data generated by the industrial assets, or other types of data.

An on-premise cloud agent 940 is configured to collect the live or historical data from the industrial assets, either directly or by accessing data storage 936 associated with data concentrator 928. Cloud agent 940 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 902. Cloud agent 940 provides a software mechanism to dynamically link on-premise-to-cloud gateways. Cloud agent 940 provides an expandable data type schema that allows new data types to be added without the need to redeploy the monitoring system to the cloud.

During data collection, the cloud agent 940 can intelligently sort and organize the data based on defined criteria, including but not limited to time of occurrence and/or user-defined priorities. Cloud agent 940 can be, for example, a service (e.g., a Windows service) that periodically collects and transmits serialized and compressed data into the cloud domain using standard web services over HTTPS/SSL.

FIG. 9 depicts data concentrator 928 as the data source for cloud agent 940. This configuration can be useful if there are a large number of data points to monitor, since the data concentrator can 928 can link multiple industrial devices or other data sources to a single cloud agent 940. However, some embodiments of cloud agent 940 can collect data directly from the industrial assets themselves; e.g., through a common industrial protocol link, or through middleware applications such as OPC clients.

Figure 10:
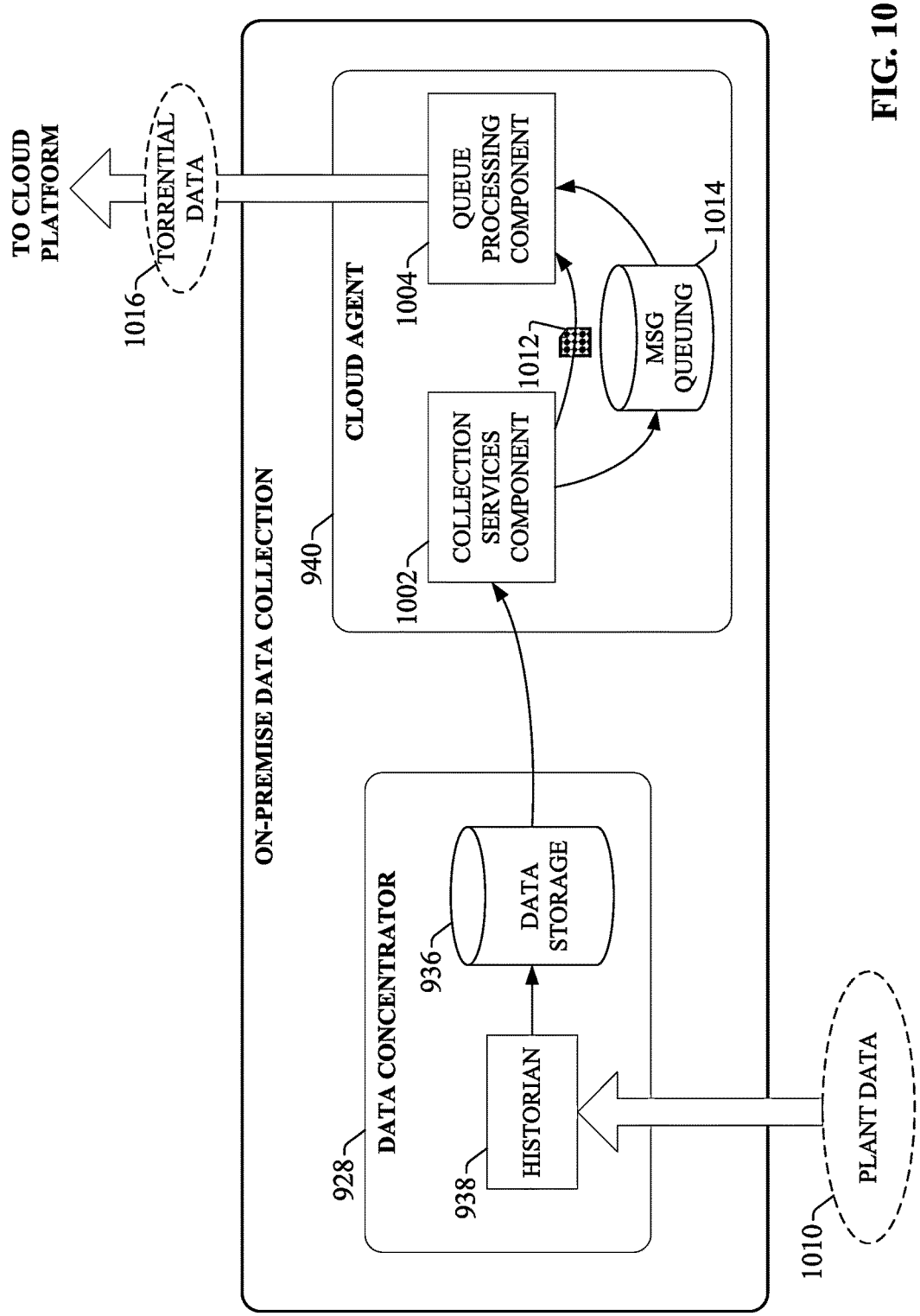
FIG. 10 is a block diagram illustrating on-premise data collection.

Cloud agent functionality is illustrated in more detail with reference to FIG. 10. On-premise data collection is enabled by a collection of services that function as a virtual support engineer for processing data. Data concentrator 928 and cloud agent 940 respectively implement two main functions associated with data collection—data concentration using a historian 938 and associated data storage 936 (e.g., an SQL server), and cloud data enablement using cloud agent services executed by cloud agent 940. As noted above, plant data 1010 is collected by data concentrator 928 at the plant facility. In an example scenario, plant data 1010 may comprise stamping press time series sensor data, made up of thousands of data points updated at a rate of less than a second.

Collection services component 1002 of cloud agent 940 implements collection services that collect device data, either from data concentrator's associated data storage (e.g., via an SQL query) or directly from the devices themselves via a common industrial protocol (CIP) link or other suitable communication protocol. For example, to obtain data from data concentrator 928, collection services component 1002 may periodically run a data extraction query (e.g., an SQL query) to extract data from data storage 936 associated with data concentrator 928. Collection services component 1002 can then compress the data and store the data in a compressed data file 1012. Queue processing services executed by queue processing component 1004 can then read the compressed data file 1012 and reference a message queuing database 1014, which maintains and manages customer-specific data collection configuration information, as well as information relating to the customer's subscription to the cloud platform and associated cloud services. Based on configuration information in the message queuing database 1014, queue processing component 1004 packages the compressed data file 1012 into a data packet and pushes the data packet to the cloud platform. In some embodiments, the cloud agent 940 can support injecting data packets as torrential data 1016.

Message queuing database 1014 can include site-specific information identifying the data items to be collected (e.g., data tag identifiers), user-defined processing priorities for the data tags, firewall settings that allow cloud agent 940 to communicate with the cloud platform through a plant firewall, and other such configuration information. Configuration information in message queuing database 1014 instructs cloud agent 940 how to communicate with the identified data tags and with the remote data collection services on the cloud platform.

In addition to collection and migration of data, one or more embodiments of cloud agent 940 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 940 may be configured to compress the collected data using any suitable data compression algorithm prior to migrating the data to the cloud platform. This can include detection and deletion of redundant data bits, truncation of precision bits, or other suitable compression operations. In another example, cloud agent 940 may be configured to aggregate data by combining related data from multiple sources. For example, data from multiple sensors measuring related aspects of an automation system can be identified and aggregated into a single cloud upload packet by cloud agent 940. Cloud agent 940 may also encrypt sensitive data prior to upload to the cloud. In yet another example, cloud agent 340 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 940 may also transform a specified subset of the industrial data from a first format to a second format in accordance with a requirement of a cloud-based analysis application. For example, a cloud-based reporting application may require measured values in ASCII format. Accordingly, cloud agent 940 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 940 may also associate metadata with selected subsets of the data prior to migration to the cloud, thereby contextualizing the data within the industrial environment. For example, cloud agent 940 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 940 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 940 can support HTTPS/SSL, certificate authority enabled transmission, and/or unique identity using MAC addresses. Cloud agent 940 can also support store-and-forward capability to ensure data is not lost if the agent becomes disconnected from the cloud.

Returning now to FIG. 9, cloud agent 940 sends compressed data packet 924 to the cloud-based data collection and monitoring system on cloud platform 902 via a cloud storage fabric 916. The data packet 924 conveys parameters and data (compressed and serialized) used by the cloud-side services to reconstruct the domain data structure in the cloud using auxiliary tenant-level manifests. The cloud services direct remote storage of the received data into preconditioned transient blobs 910. The cloud platform 902 can use agent reasoning and collective bargain features to determine a data storage locale.

Through the configuration interface provided by cloud agent 940, users at the plant facility can dynamically configure one or more priority queues 904 that respectively define how the data packets are processed in the cloud platform 902. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 940 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 940 can allow the user to define these priority queues 904 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by the cloud HMI application to display substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent 940, users can assign priorities to respective data tags or tag groups at the customer site. These priority assignments can be stored in the message queuing database 1014 of the cloud agent 940. Accordingly, when queue processing component 1004 packages the collected data to be moved to the cloud platform, the collected data items can be packaged into data packets according to priority (as defined in message queuing database 1014), and the respective data packet headers populated with the appropriate priority level. If access to the cloud is unavailable, data will continue to be collected by collection services component 1002 and stored locally on the cloud agent in local storage associated with collections services. When communication to the cloud is restored, the stored data will be forwarded to cloud storage. Queue processing services can also encrypt and send storage account keys to the cloud platform for user verification.

Figure 11:
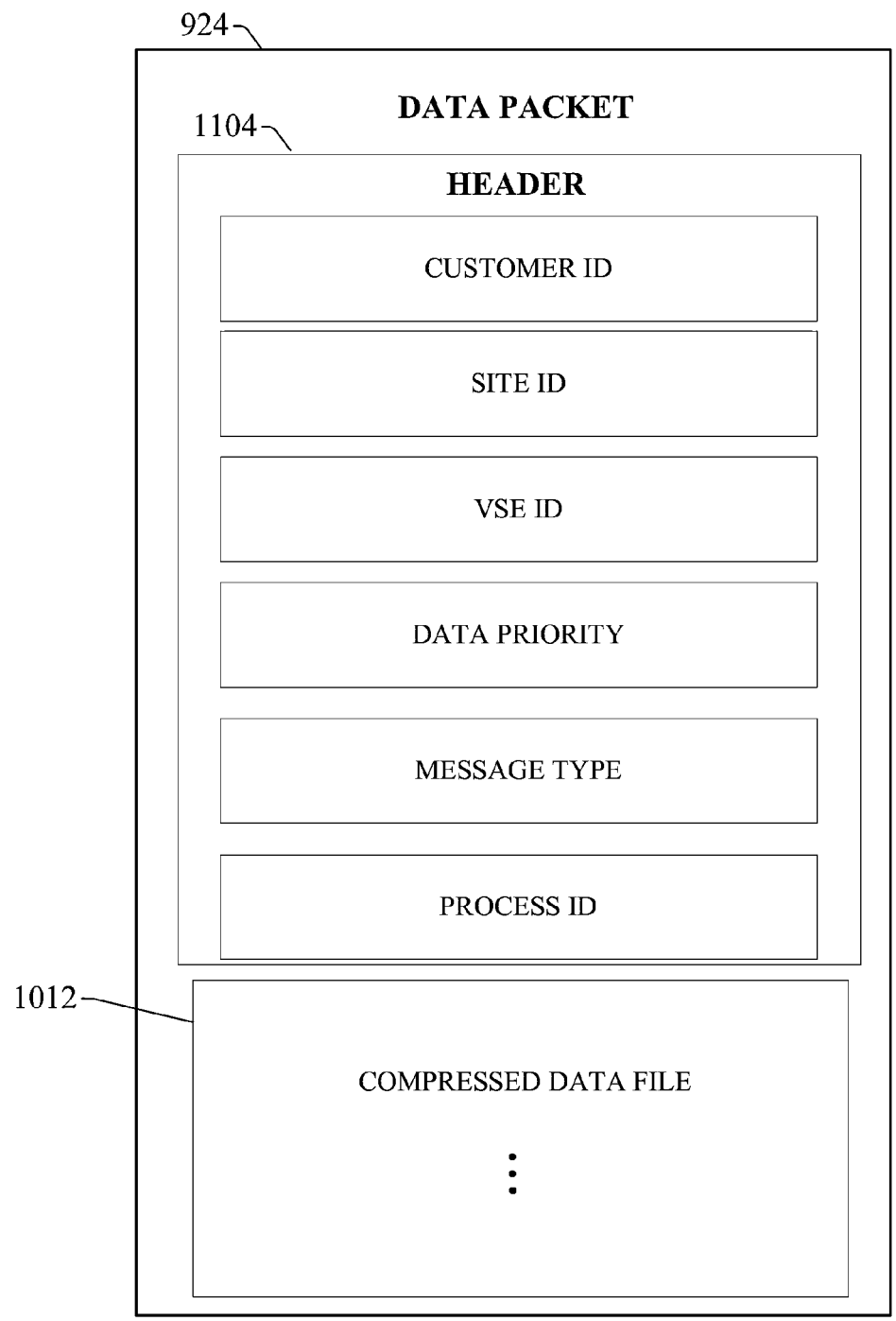
FIG. 11 is a diagram of an example compressed data packet.

Message queuing services implemented by queue processing component 1004 of cloud agent 940 encapsulates or packages the compressed data file by adding customer-specific header information to yield a compressed data packed (e.g., compressed data packet 924 of FIG. 9). For example, the queue processing component 1004 can access a message queuing database (e.g., message queuing database 1014 of FIG. 10), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 11. As shown, the cloud agent's message queuing services add a header 1104 to compressed data file 1012 to yield the compressed data packet 924. The header 1104 contains customer-specific data read from message queuing database 1014. For example, header 1104 can include a unique customer identifier, a site identifier representing a particular plant facility, a virtual support engineer identifier, a data priority for the data in the compressed data file 1012, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure When cloud agent 940 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 904 based on the priority. On the other side of the priority queues 904, a data process service 908 processes data in the respective priority queues 904 according to the predefined processing definitions. The data processing service includes a worker role 932 that determines how the queued data is to be processed based on manifests (e.g., system manifests, tag manifests, and metric manifests) stored in a customer-specific manifest assembly 934. Manifests define and implement customer-specific capabilities, applications, and preferences for processing collected data in the cloud. Manifests can be dynamically uploaded by a user at the plant facility through cloud agent 940, which facilitates dynamic extension of cloud computing capability.

For example, if new data points are to be added to the data collection system that require creation of a new data queue, the user can interact with cloud agent 940 to configure a new manifest for the new queue, the manifest defining such aspects as processing priority for the data, upload frequency for the data, where the data is to be routed or stored within cloud storage, and other such information. Cloud agent 940 can then upload the new manifest 906 together with the data (or independently of the data). The new manifest 906 is then added to the customer's manifest assembly 934 with the other manifests defined for the customer, so that worker role 932 can leverage the new manifest 906 to determine how data in the new queue is to be processed. This new manifest 906 need only be uploaded to the cloud-based remote monitoring service once. Thereafter, data placed in the new priority queue will be processed by worker role 932 according to the new manifest 906 stored in the customer's manifest assembly 934. For example, the manifest may define where the data is to be stored within cloud storage (e.g., in a historical database, and Alarms and Live Data database, big data storage 912, etc.), and whether processing of the new data queue is to take priority over other data queues. In some embodiments, the manifest assembly 934 may only accept a new manifest if the manifest is accompanied by a unique key associated with the client.

Once the cloud-based infrastructure has processed and stored the data provided by cloud agent 940 according to the techniques described above, the data can be made accessible to client devices 922 for viewing; e.g., via the cloud HMI generated by the cloud HMI generation system described herein. Data analysis on the cloud platform 902 can provide a set of web-based and browser enabled technologies for retrieving, directing, and uncompressing the data from the cloud platform 902 to the client devices 922. The cloud HMI services 716 can be implemented on cloud platform 902 and accessed by client devices 922 to invoke the cloud HMI on a browser interface executing on the client devices. The cloud data retrieval scripts implemented by the cloud HMI service 716 (and generated by the cloud HMI generation system) can access the appropriate data items maintained on big data storage 912 and provide this data to the client devices 922 via the graphical elements of the cloud HMI reproduced on the client devices by the drawing scripts.

In some embodiments, the cloud platform 902 may also implement reporting services 914, which can deliver data in cloud storage (e.g., from the big data storage 912) to client devices via dashboards and reports 920 An analytic engine 918 executing on the cloud platform 902 can also perform various types of analysis on the data stored in big data storage 912 and provide results to client devices, via either the dashboards and reports 920 or the cloud HMI services.

Figure 12:
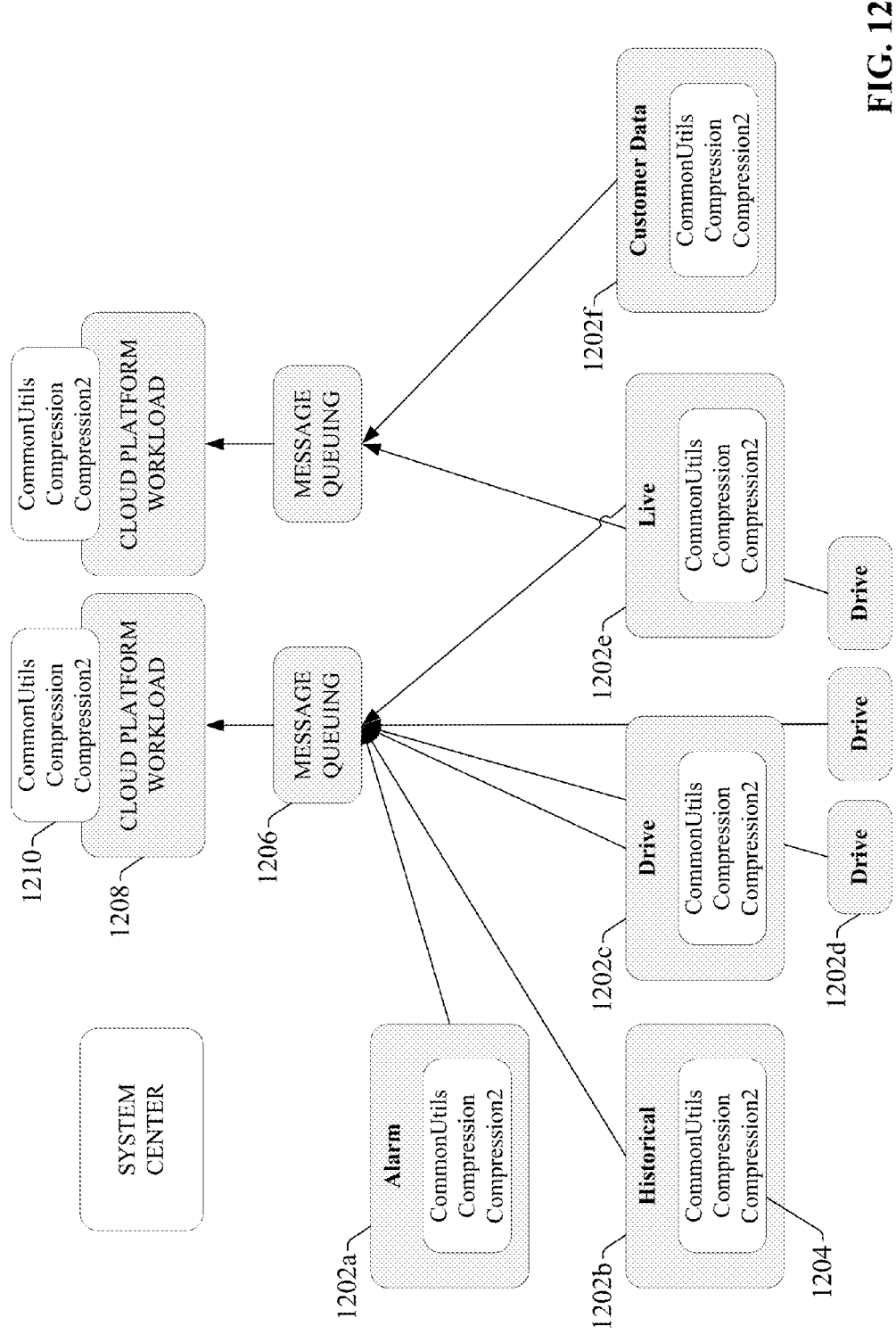
FIG. 12 is a block diagram of an example agent architecture for collection of data from on-premise industrial devices.

FIG. 12 is a block diagram illustrating an example agent architecture for collection of data from on-premise industrial devices according to one or more embodiments. In this example, data is collected from a number of devices and applications 1202 at the customer site, including an alarm database 1202*a*, data historian 1202*b*, motor drives 1202*c* and 1202*d*, live data server 1202*e*, and a customer database 1202*f*. Although these data sources comprise a diverse, heterogeneous collection of devices and applications, collection and pre-processing of data from these sources can be carried out by generic services 1204 (e.g., service libraries). Generic services 1204 can include utilities for identifying the data locations (e.g., devices, applications, tags, registers, etc.) from which data is to be retrieved, utilities for compressing or otherwise pre-processing the data, and providing the data to the message queuing layers 1206 of the cloud agents. The workload services 1208 of the cloud agents can also utilize generic services 1210 to encapsulate and send the data to the cloud fabric. The message queuing layers 1206 and workload services 1208 make up the backbone of the decoupled agent architecture.

Figure 13:
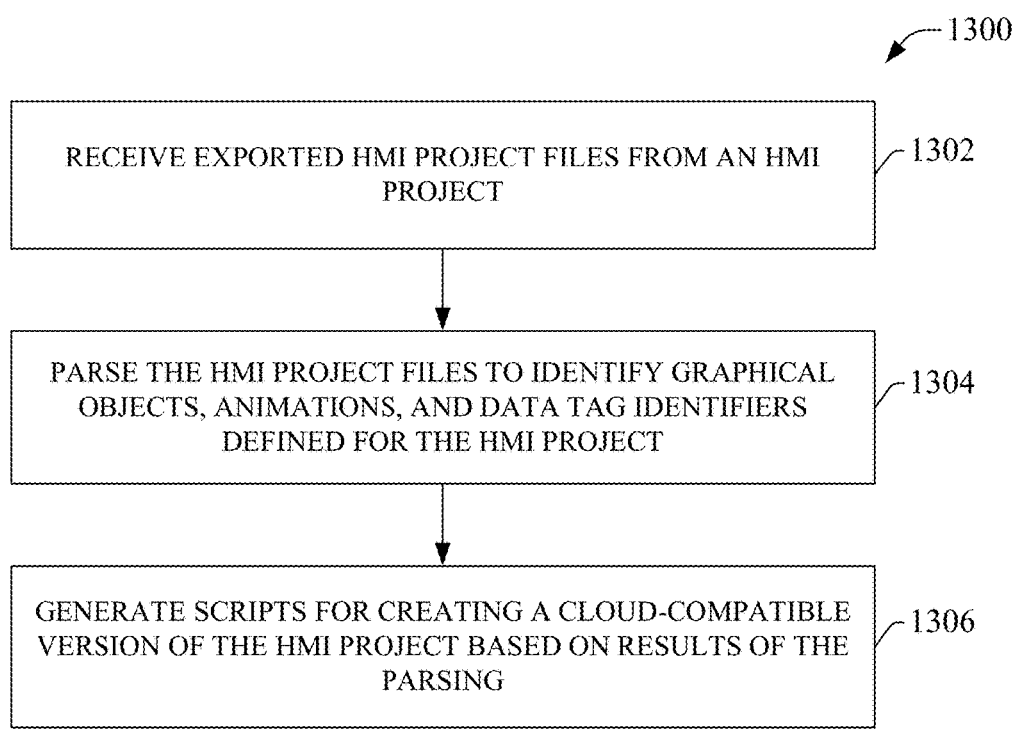
FIG. 13 is a flowchart of an example methodology for generating a cloud HMI application corresponding to an existing conventional HMI application.
Figure 14:
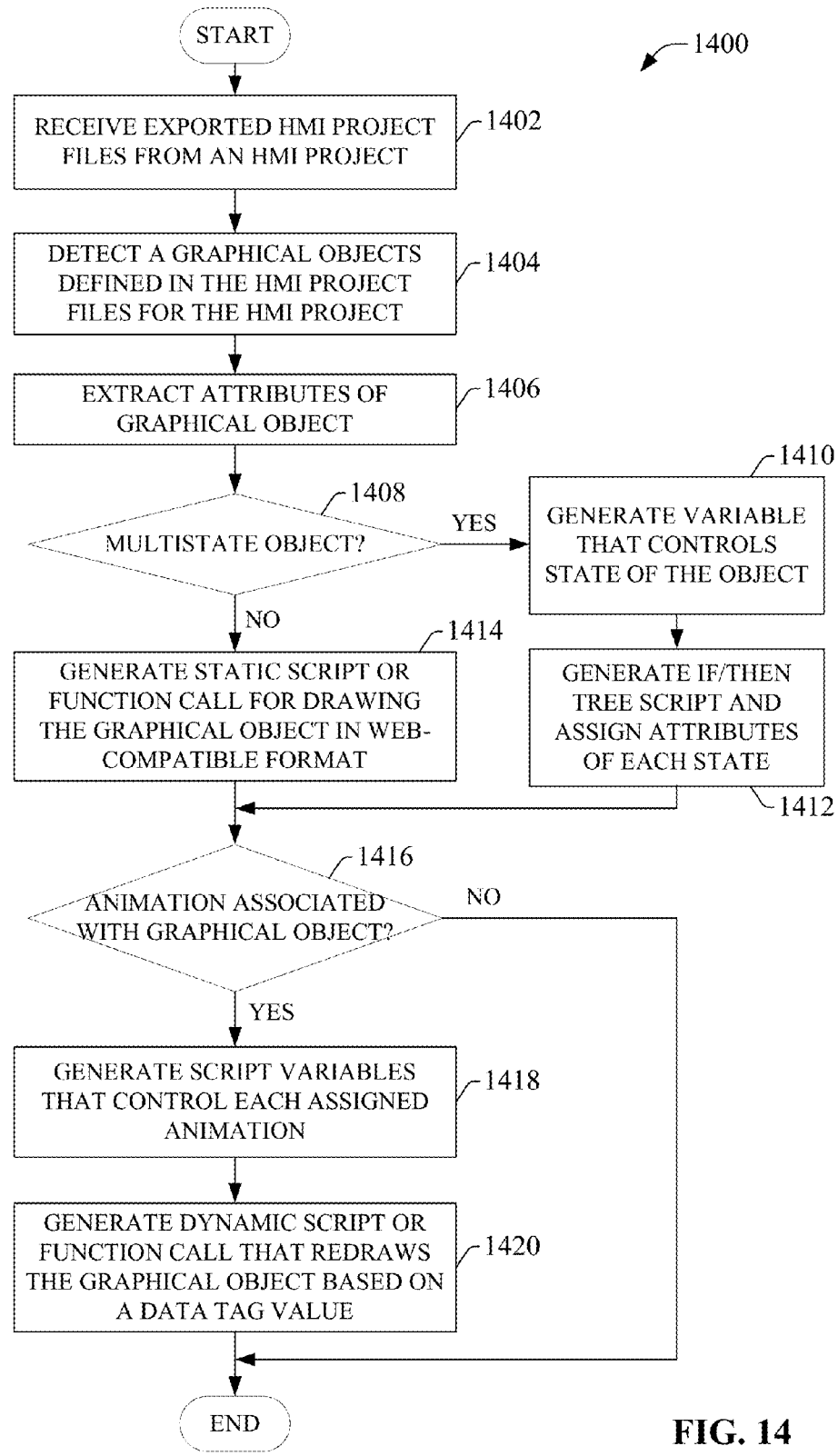
FIG. 14 is a flowchart of an example methodology for generating scripts for recreating HMI graphical objects in a web-compatible format.
Figure 15:
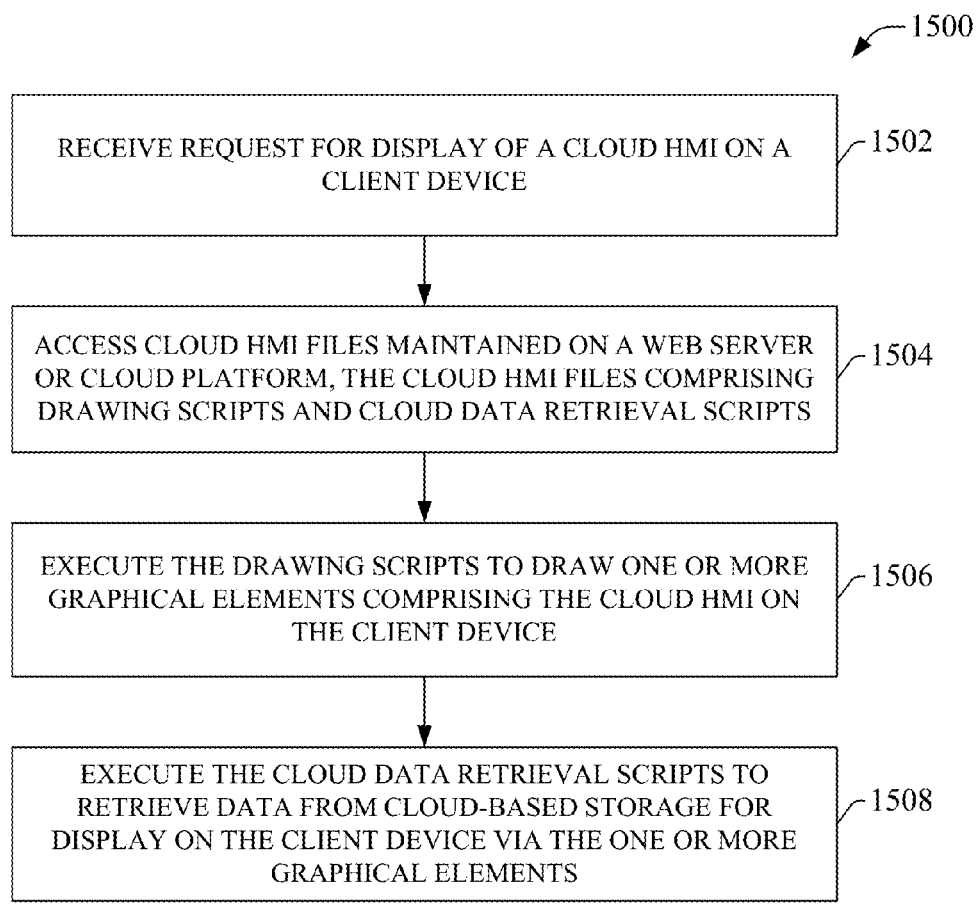
FIG. 15 is a flowchart of an example methodology for delivering a cloud HMI to a client device using files generated by a cloud HMI generation system.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for generating a cloud HMI application corresponding to an existing conventional HMI application. Initially, at 1302, exported HMI project files are received from an HMI project. These exported files may comprise, for example, XML files exported from the HMI project and defining the graphical objects that make up the application, as well as the properties of those graphical objects (location, color, animations, shape, size, etc.). The exported files can also define the data tags (e.g., controller data tags or memory locations, or other data source) with which the HMI application is configured to communicate. These data tags represent the data sources from which data is to be read for display on the HMI, or data locations to which data entered via the HMI is to be written.

At 1304, the HMI project files are parsed to identify the graphical objects, animations, and data tag identifiers defined for the HMI project. This parsing of the HMI project files can be carried out by a cloud HMI generation system configured to create web-compatible versions of existing HMI projects. At 1306, scripts for creating a cloud-compatible or web-compatible version of the original HMI project are generated based on results of the parsing performed at step 1304. These scripts can include, for example, drawing scripts that, when executed, draw reproductions of the identified graphical objects in a lightweight, web-compatible format (e.g., scalable vector graphics or other format), as well as scripts for retrieving data corresponding to the identified data tags for display on the cloud version of the HMI. These data retrieval scripts can be generated to retrieve replicated versions of the original tag data residing on cloud platform or another data storage location.

FIG. 14 illustrates an example methodology 1400 for generating scripts for recreating HMI graphical objects in a web-compatible format. Initially, at 1402, exported HMI project files are received from an existing HMI project. At 1404, a graphical object defined in the HMI project files for the HMI project is detected. The graphical object can be detected, for example, by parsing or otherwise analyzing the HMI project files to identify the objects and characteristics of the original HMI project. At 1406, attributes of the graphical object are extracted from the HMI project file. These attributes can include, for example, the type of graphical object, the size and shape of the object, the object's color, the location of the object on its home HMI interface screen, whether the object is a multi-state indicator, whether an animation feature has been configured for the object, or other such properties.

At 1408, a determination is made regarding whether the graphical object is a multistate object based on the attributes extracted at step 1406. If the graphical object is not a multistate object, the methodology moves to step 1414, where a static script or function call is generated for drawing the graphical object in web-compatible format. Alternatively, if the object is determined to be a multi-state object, the methodology moves to step 1410, where a variable that controls the state of the object is generated. At 1412, an if/then tree script is generated and the attributes of each state of the multistate object are assigned to respective branches of the if/then tree script, where the branches of the tree script are selected based on the value of the variable generated at step 1410.

At step 1416, a determination is made regarding whether an animation is associated with the graphical object. If no animation is associated with the graphical object, the methodology ends. Alternatively, if animation has been defined for the object, the methodology moves to step 1418, where script variables are generated that control each assigned animation. At 1420, a dynamic script of function call is generated that redraws the graphical object based on a value of a data tag specified by the animation configuration. The dynamic script alters the state of the graphical object in accordance with the data tag value and the state properties defined for each state by the animation configuration.

FIG. 15 illustrates an example methodology 1500 for delivering a cloud HMI to a client device using files generated by the cloud HMI generation system described herein. Initially, at 1502, a request is received for display of a cloud HMI on a client device. The request may be received, for example, at a cloud platform or web server that hosts the cloud HMI files. At 1504, cloud HMI files maintained on a web server or cloud platform are accessed in response to the request. The cloud HMI files can comprise drawings scripts for reproducing the graphical object of the HMI on the client device, and cloud data retrieval scripts for retrieving industrial system data from cloud storage for display on the HMI.

At 1506, drawing scripts are executed to draw one or more graphical elements of the cloud HMI on the client device. In some embodiments the scripts may draw the graphics using scalable vector graphics or other suitable graphics standard. At 1508, the cloud data retrieval scripts are executed to retrieve data from cloud-based storage for display on the client device via one or more graphical elements drawn at step 1506.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
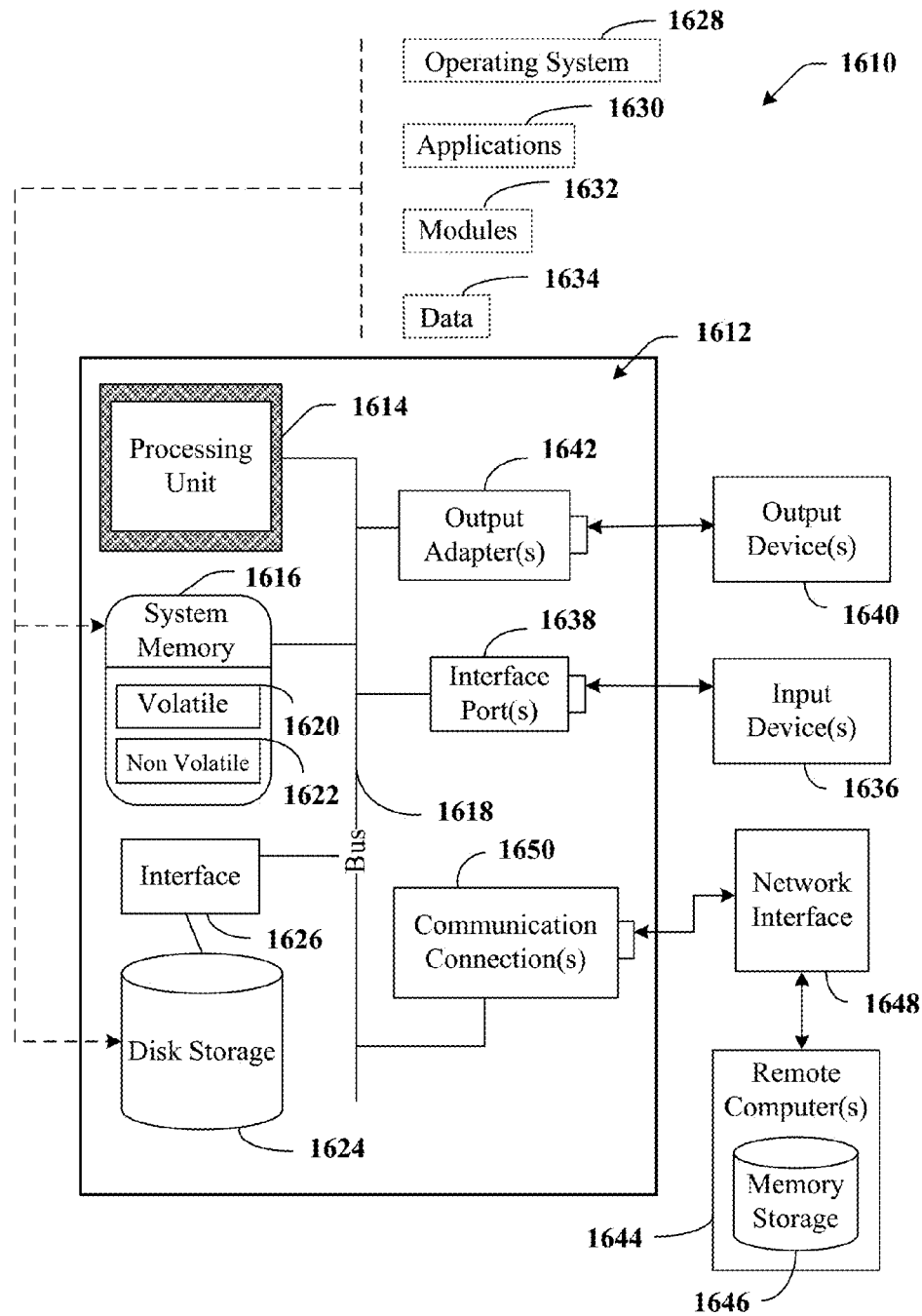
FIG. 16 is an example computing environment.
Figure 17:
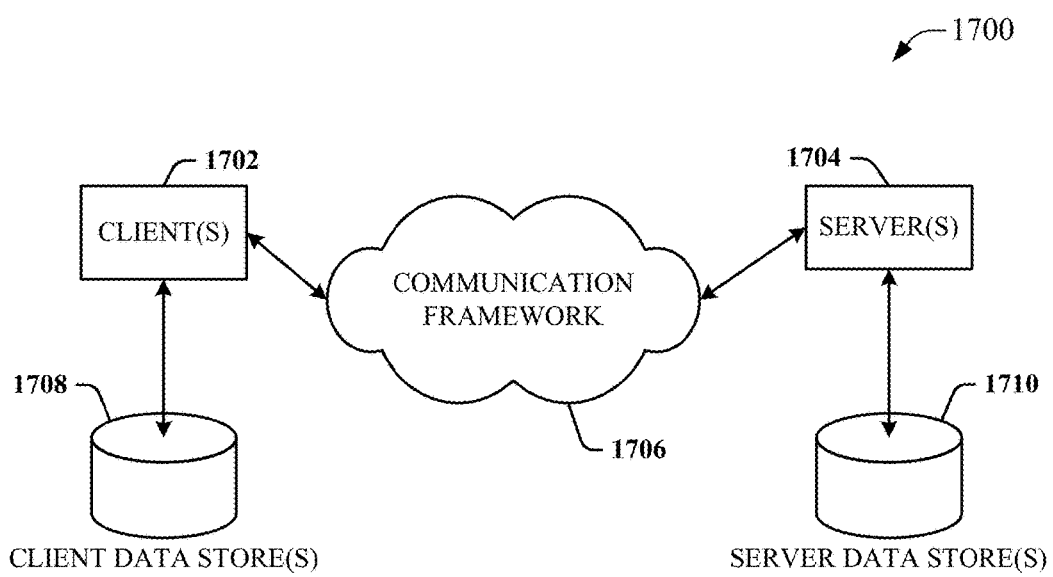
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 2234 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 2246 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generating a human-machine interface (HMI) application capable of execution on a cloud platform, comprising:
  a memory that stores computer-executable components;
  a processor, operatively coupled to the memory, that executes the computer-executable components, the computer-executable components comprising:
    an import component configured to import one or more HMI project files that define an HMI project developed in a first format corresponding to the HMI application;
    an element drawing component configured to identify one or more first graphical objects defined by the one or more HMI project files and to generate one or more drawing scripts that, in response to first execution, reproduce the one or more first graphical objects in a second format, corresponding to the cloud platform, to yield one or more second graphical objects, wherein a graphical object of the one or more first graphical objects is a multistate indicator in which a state of the multistate indicator is based on a data value that is dynamically updated by an industrial controller of an industrial system;

a tag identification component configured to identify one or more data tags defined by the HMI project files, wherein a data tag, of the one or more data tags, corresponding to the graphical object comprises an indicator that the data value is dynamically updated by the industrial controller; and a cloud mapping component configured to generate one or more data retrieval scripts that, in response to second execution, retrieve one or more data items corresponding to the one or more data tags from a specified data source, wherein the one or more data retrieval scripts comprises a data writing script, corresponding to the data tag, that facilitates pushing the data value to the data tag, and wherein the cloud mapping component generates the data writing script in response to the indicator.

2. The system of claim 1, wherein the one or more drawing scripts, in response to the first execution, draw the one or more second graphical objects in the second format on a web page.

3. The system of claim 1, wherein the specified data source comprises one or more cloud storage devices.

4. The system of claim 3, wherein the cloud mapping component is configured to identify the one or more data items corresponding to the one or more data tags based on a cloud database schema file that defines a storage schema used to store industrial data from the industrial system on the one or more cloud storage devices.

5. The system of claim 1, further comprising a cloud interface component configured to export the one or more drawings scripts and the one or more data retrieval scripts to a cloud platform device.

6. The system of claim 5, wherein the element drawing component is further configured to, for a first graphical object of the one or more first graphical objects, identify one or more animation attributes associated with the graphical object, wherein the one or more drawing scripts, in response to the first execution, emulate the one or more animation attributes for a second graphical object of the one or more second graphical objects.

7. The system of claim 6, wherein the one or more animation attributes are controlled by a first data tag of the one or more data tags defined by the HMI project files, and the cloud mapping component is configured to generate the one or more data retrieval scripts to retrieve a first data item corresponding to the first data tag and control a state of the second graphical object based on the first data item.

8. The system of claim 1, wherein, the element drawing components is further configured to, in response to determining that the graphical object of the one or more first graphical objects is the multistate object, generate a variable that controls a state of the graphical object and generate the one or more drawings scripts to include an if/then tree script having branches corresponding to respective states of the graphical object.

9. The system of claim 1, wherein the element drawing component and the cloud mapping component are configured to generate one or more cloud HMI files including the one or more drawing scripts and the one or more data retrieval scripts, and wherein the one or more cloud HMI files are configured to execute the one or more drawing scripts and the one or more data retrieval scripts to emulate the HMI project on a client device that invokes the one or more cloud HMI files.

10. A method for converting a human-machine interface (HMI) application to a cloud-compatible HMI application, comprising:

receiving, by a system comprising a processor, an HMI project file that defines an HMI project developed in a first format;

parsing the HMI project file to identify a first graphical object defined by the HMI project file and a data tag that controls a state of the first graphical object, wherein the first graphical object is determined to be a multistate indicator and a state of the multistate indicator is a function of a data item that is dynamically modified by an industrial controller, and wherein the data tag comprises an indicator that the data item is dynamically modified by the industrial controller;

generating a drawing script that, in response to execution, reproduces the first graphical object in a second format to yield a second graphical object;

in response to the indicator, generating a data writing script, corresponding to the data tag that, in response to the data item being modified, populates a defined data source with the data item from the industrial controller; and generating a data retrieval script that, in response to execution, retrieves the data item corresponding to the data tag from the defined data source.

11. The method of claim 10, further comprising, in response to execution of the drawing script, reproducing the graphical object on a web page.

12. The method of claim 10, further comprising, in response to execution of the data retrieval script, retrieving the data item from a cloud storage device comprising the defined data source.

13. The method of claim 12, further comprising identifying the data item corresponding to the data tag based on a cloud database storage schema file that defines a storage schema used to store industrial data on the cloud storage device.

14. The method of claim 10, further comprising exporting the drawing script and the data retrieval script to a cloud platform device.

15. The method of claim 10, wherein the generating the data retrieval script comprises generating the data retrieval script to, in response to execution, control a state of the second graphical object based on a value of the data item.

16. The method of claim 10, wherein the generating the drawing script comprises generating an if/then tree script comprising branches corresponding to respective states of the second graphical object.

17. The method of claim 10, further comprising generating a cloud HMI file comprising the drawing script and the data retrieval script, wherein the cloud HMI file is configured to, in response to invocation by a client device, execute the drawing script and the data retrieval script to reproduce the second graphical object via a web browser of the client device.

18. A non-transitory computer-readable medium having stored thereon instructions that, in response to execution, cause a system comprising a processor to perform operations, the operations comprising:

receiving one or more HMI project files that define an HMI project developed in a first format;

parsing the HMI project files to identify a first graphical object defined by the one or more HMI project files and a data tag that controls a state of the first graphical object, wherein the first graphical object is determined to be a multistate indicator and a state of the multistate indicator is a function of a data item that is dynamically updated by an industrial controller, and wherein the data tag comprises an indicator that the data item is dynamically updated;

generating a drawing script that, in response to execution, draws the first graphical object in a second format to yield a second graphical object;

in response to the indicator, generating a data writing script, corresponding to the data tag that, in response to the data item being updated, populates a specified data source with the data item from the industrial controller; and generating a data retrieval script that, in response to execution, retrieves the data item corresponding to the data tag from the specified data source.

19. The non-transitory computer-readable medium of claim 18, wherein the generating the drawing script comprises generating the drawing script in a format that draws the second graphical object on a web page.

20. The non-transitory computer-readable medium of claim 18, wherein the generating the data retrieval script comprises generating the data retrieval script to retrieve the data item from a cloud storage location.

\* \* \* \* \*